(12) United States Patent
Matsuoka

(10) Patent No.: US 8,451,742 B2
(45) Date of Patent: May 28, 2013

(54) APPARATUS AND METHOD FOR CONTROLLING DATA COMMUNICATION

(75) Inventor: Naoki Matsuoka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 857 days.

(21) Appl. No.: 12/620,934

(22) Filed: Nov. 18, 2009

(65) Prior Publication Data

US 2010/0182920 A1 Jul. 22, 2010

(30) Foreign Application Priority Data

Jan. 21, 2009 (JP) ................................. 2009-010505

(51) Int. Cl.
*G06F 11/00* (2006.01)

(52) U.S. Cl.
USPC ........................................................ 370/252

(58) Field of Classification Search
USPC ........................................................ 370/252
See application file for complete search history.

(56) References Cited

U.S. PATENT DOCUMENTS

| 2002/0061027 | A1* | 5/2002 | Abiru et al. ................... 370/413 |
| 2003/0063611 | A1* | 4/2003 | Schaub et al. ............ 370/395.32 |
| 2003/0128706 | A1* | 7/2003 | Mark et al. .................. 370/395.1 |
| 2004/0085999 | A1* | 5/2004 | Burnett et al. ................ 370/474 |
| 2005/0276263 | A1  | 12/2005 | Suetsugu |
| 2006/0182112 | A1* | 8/2006 | Battle et al. ................... 370/392 |

FOREIGN PATENT DOCUMENTS

| JP | 2006-5437 A | 1/2006 |
| JP | 2007-180891 A | 7/2007 |

* cited by examiner

*Primary Examiner* — Jason Mattis
*Assistant Examiner* — Stephen J Clawson
(74) *Attorney, Agent, or Firm* — Fujitsu Patent Center

(57) ABSTRACT

A communication apparatus includes an input interface to receive a flow of segmented data, and an output interface to transmit the received data from a plurality of physical links. The output interface includes storage units corresponding to the respective physical links to store transmission data. A link monitor unit observes how much data is accumulated in each storage unit. A distribution unit selects which physical link is to be used to output the received data. Based on the observations by the link monitor unit, the distribution unit changes the selection to an alternative physical link that has a larger amount of stored data than the currently selected physical link.

15 Claims, 29 Drawing Sheets

FIG. 6

| ENTRY | LAG | DESTINATION TABLE PORT | | | | | |
|---|---|---|---|---|---|---|---|
| | | #0 | #1 | #2 | #3 | ... | #15 |
| ADDRESS A | 1 | 1 | 1 | 1 | 0 | ... | 0 |
| ADDRESS B | 0 | 0 | 0 | 1 | 0 | ... | 0 |
| ... | ... | ... | ... | ... | ... | ... | ... |

| DISTRIBUTION MANAGEMENT TABLE | | | 152a |
|---|---|---|
| FLOW IDENTIFIER | OUTPUT PORT NUMBER | LAST ENTRY |
| A | 0 | 2008/12/22/12:45 |
| B | 1 | 2008/12/22/12:31 |
| ⋮ | ⋮ | ⋮ |

| OUTPUT PORT TABLE | | | |
|---|---|---|---|
| PORT | LOAD | QUEUE LENGTH | STATUS |
| 0 | 50 | 100 | CONGESTED |
| 1 | 60 | 70 | NORMAL |
| 2 | 70 | 150 | NORMAL |
| 3 | - | - | FAILED |

．．．．
．．．．
．．．．

APPARATUS AND METHOD FOR CONTROLLING DATA COMMUNICATION

CROSS-REFERENCE TO RELATED APPLICATION(S)

This application is based upon and claims the benefit of priority of the prior Japanese Patent Application No. 2009-010505, filed on Jan. 21, 2009, the entire contents of which are incorporated herein by reference.

FIELD

The embodiments discussed herein relate to an apparatus and method for controlling data communication.

BACKGROUND

With the increasing use of sophisticated network services, the amount of data traffic over communication networks has been growing dramatically, accelerating the development of network routers and switches with enhanced bandwidths. To transfer large amounts of data between routers and switches, a technique called "link aggregation" (LAG) is used to bundle a plurality of physical ports in a network device into a single logical port. This trunking technique, defined by the IEEE 802.3ad standard, permits a communication apparatus to reach a peer communication apparatus by using a plurality of physical links (e.g., network cables) concurrently. When bundled, those physical links will behave virtually as a single logical link.

The link aggregation technology makes it possible to expand network bandwidth without the need for deploying high-speed physical communication channels. In addition to providing an increased bandwidth, the link aggregation enhances the fault tolerance of a communications system. That is, even if a failure occurs to one of the physical channels, the communications system can continue to operate by using the remaining channels.

As an example application of link aggregation, Japanese Laid-open Patent Publication No. 2007-180891 proposes a communication apparatus which distributes received packets, as necessary, to a plurality of output ports constituting an aggregated link. The proposed communication apparatus changes the direction of received packets to another physical port when the currently used physical port becomes congested. This communication apparatus allows, however, a single flow of packets to be directed to different physical ports in the middle of that flow. When this happens, the packets may be transmitted in a different order from that in which they were received, and as a result, the quality of communication could be degraded.

To alleviate the above-noted problem, the communication apparatus may be modified to select a physical port when the first packet of a flow is received and continue to use that physical port throughout the flow. This solution, however, does not work well for a long flow of packet. If, for example, the load of such a long data flow is concentrated on a single physical port that is selected, the selected port would gradually fall into congestion, thus causing frequent packet loss and consequent degradation of communication quality.

As another example application of such link aggregation techniques, Japanese Laid-open Patent Publication No. 2006-005437 proposes a communication apparatus which determines an output physical port for received packets by using hash values of those packets. The proposed communication apparatus also calculates flow ratios between physical ports and uses them as feedback information in determining bandwidth allocation ratios. A drawback of this communication apparatus is its inability to make effective use of link aggregation bandwidth in the case where the incoming packets have an uneven distribution of address values and thus concentrate into a particular physical port.

SUMMARY

According to an aspect of the invention, there is provided a communication apparatus for transferring segmented data over an aggregation of physical links constituting a logical link. This communication apparatus includes the following elements: an input interface to receive a flow of data in segmented form; an output interface comprising a plurality of physical links to transmit the received data, and a plurality of storage units corresponding to the respective physical links to store data to be transmitted from the physical links; a link monitor unit to observe how much data is accumulated in each storage unit; and a distribution unit to select which physical link is to be used to output the received data, and to change the selection to an alternative physical link that has a larger amount of stored data than the currently selected physical link, based on observations by the link monitor unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWING(S)

FIG. 1 gives an overview of a communication apparatus according to an embodiment;

FIG. 2 gives an overall view of a communications system;

FIG. 6 illustrates an example data structure of a destination table;

FIG. 7 illustrates an example data structure of a distribution management table;

FIG. 8 illustrates an example data structure of an output port table;

DESCRIPTION OF EMBODIMENT(S)

Figure 1:
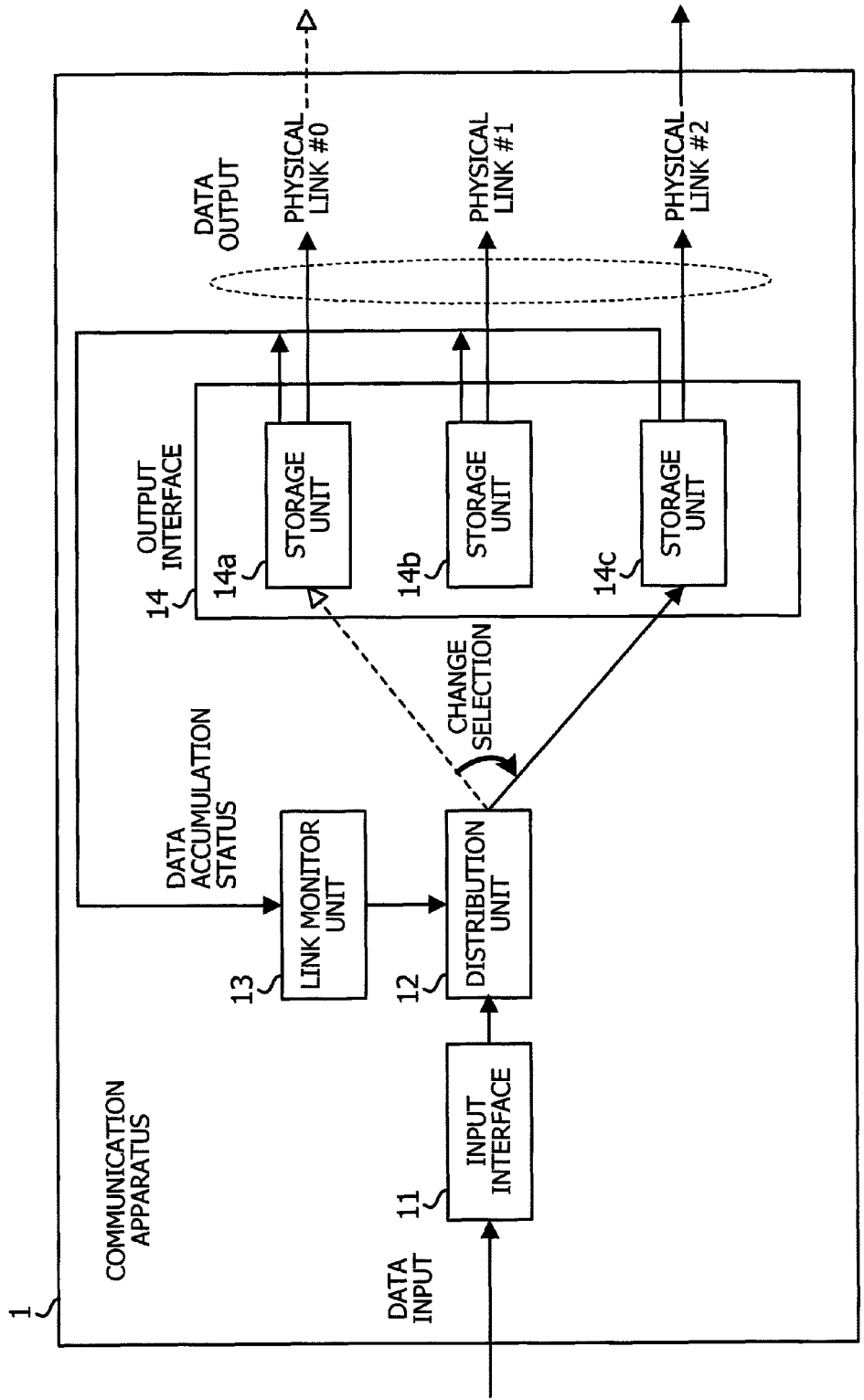

Embodiments of the present invention will be described below with reference to the accompanying drawings, wherein like reference numerals refer to like elements throughout.

FIG. 1 gives an overview of a communication apparatus 1 according to an embodiment. To transfer segmented data over an aggregation of physical links constituting a logical link, the illustrated communication apparatus 1 includes an input interface 11, a distribution unit 12, a link monitor unit 13, and an output interface 14. The output interface 14 includes storage units 14a, 14b, and 14c and physical links #0, #1, and #2.

The input interface 11 is designed to connect with other communication apparatuses and the like via communication links. The input interface 11 receives from such a peer communication apparatus a flow of data in segmented form.

The data flow received by the input interface 11 is supposed to go out of the communication apparatus 1 through physical links #0, #1, and #2. The distribution unit 12 determines to which of the physical links #0, #1, and #2 the received data flow should be directed. The distribution unit 12 changes this selection of destination physical links as necessary, based on observations by the link monitor unit 13. Specifically, the link monitor unit 13 observes the amount of data accumulated in each storage unit 14a, 14b, and 14c corresponding to the output physical links #0, #1, and #2, thus permitting the distribution unit 12 to compare those amounts of accumulated data with each other so as to find a physical link that stores a larger amount of data than others. If such a physical link is found, then the distribution unit 12 changes the selection to that physical link and directs subsequent data of the flow to the newly selected physical link. Based on such distribution decisions or changes made by the distribution unit 12, the received data flow is directed to one of the physical links #0, #1, and #2.

As mentioned above, the link monitor unit 13 watches each storage unit 14a, 14b, and 14c to monitor how much data is accumulated in them and provides its observations to the distribution unit 12.

The output interface 14 includes a plurality of physical links #0, #1, and #2 to transmit data. The output interface 14 also includes a plurality of storage units 14a, 14b, and 14c corresponding to the physical links #0, #1, and #2 to store data to be transmitted therefrom.

The data directed to physical link #0 is stored temporarily in a storage unit 14a corresponding to that link before it is transmitted. Likewise, the data directed to physical link #1 is stored temporarily in a corresponding storage unit 14b before it is transmitted, and the data directed to physical link #2 is stored temporarily in a corresponding storage unit 14c before it is transmitted. The transmitted data signals propagate over communication channels extending from those ports and reach their respective destinations, i.e., other communication apparatuses and the like.

In operation of the above communication apparatus 1, the input interface 11 receives a data flow constituted from multiple pieces of segmented data. The received data is supposed to be transmitted via a plurality of physical links #0, #1, and #2 of the output interface 14. To store such transmit data, the output interface 14 includes storage units 14a, 14b, and 14c corresponding to physical links #0, #1, and #2. The amount of data stored in each storage unit 14a, 14b, and 14c is monitored by the link monitor unit 13, and those observations are reported to the distribution unit 12. The distribution unit 12 determines which physical link #0, #1, and #2 is to be used to transmit a given data flow. When the link monitor unit 13 observes that the storage unit of the currently selected physical link is highly occupied, the distribution unit 12 seeks an alternative physical link that has a larger amount of stored data than the currently selected physical link. The distribution unit 12 then changes its physical link selection to the alternative physical link that is found.

In the way described above, the distribution unit 12 dynamically changes its selection of physical links for a data flow. With this feature, the proposed communication apparatus 1 transmits packets without disrupting their intended transmission sequence, besides achieving more efficient forwarding of data.

The following sections will describe more specific embodiments of the communication apparatus outlined above. These embodiments provide a variety of switches as example implementations of the foregoing communication apparatus. More particularly, the switches discussed herein are layer-2 switches, which receive and forward packets of data link layer based on Media Access Control (MAC) address. It is not intended, however, to limit the scope of the present invention by those specific implementations. For example, the same features may be applied to Internet Protocol (IP) routers and layer-3 switches that operate in the network layer based on IP address. While both terms "packet" and "frame" refer to data units of layer 2 in the Open Systems Interconnection (OSI) reference model, the following part of the description will use the former term "packet" consistently to refer to such data units for the reason of expediency.

First Embodiment

Figure 2:
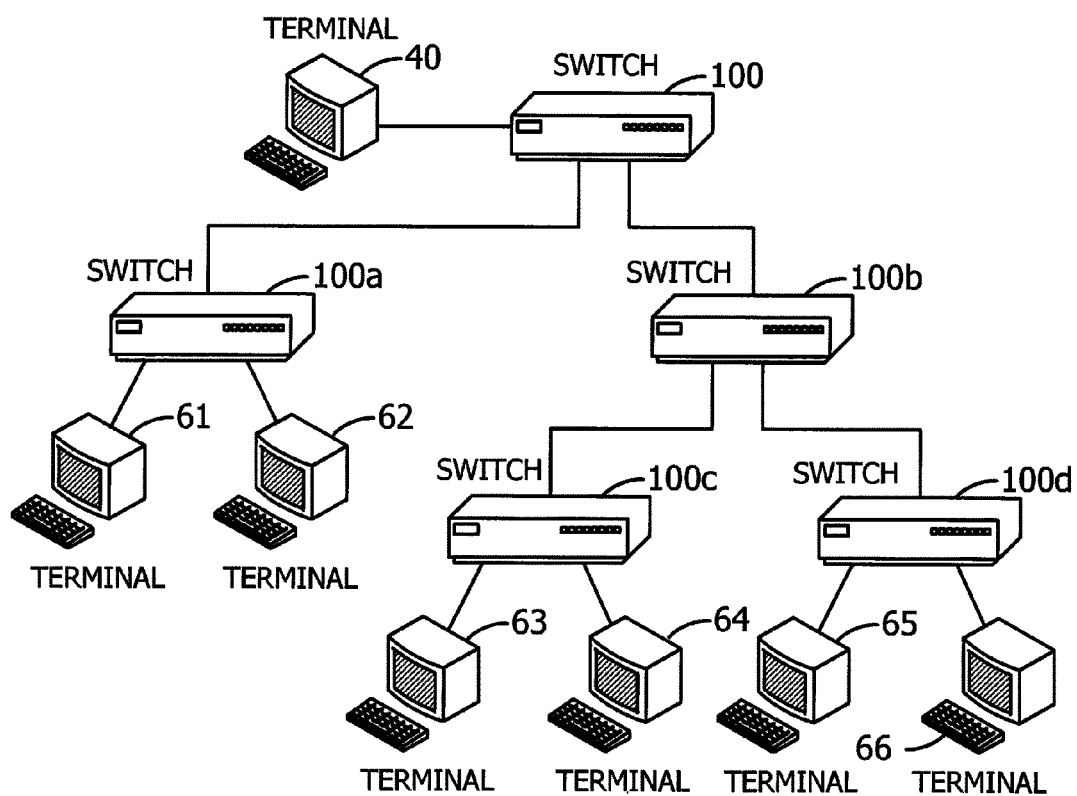

FIG. 2 gives an overall view of a communications system according to a first embodiment. This communications system employs a plurality of layer-2 switches to transport packets of data link layer, thereby permitting terminals to exchange data with each other. Specifically, the communications system illustrated in FIG. 2 is formed from layer-2 switches (or simply "switches") 100, 100a, 100b, 100c, and 100d and terminals 40, 61, 62, 63, 64, 65, and 66 attached to them. The terminal 40 attached to the topmost switch 100 in FIG. 2 serves an administrator terminal for use by the administrator of the switch 100, while the other terminals 61 to 66 are user terminals. Switches 100a, 100b, 100c, and 100d are similar, in terms of their structures and functions, to the switch 100, the details of which will be described later.

As can be seen from FIG. 2, the switch 100 is linked to two switches 100a and 100b. The switch 100b is linked to two switches 100c and 100d. Terminals 61 and 62 are attached to the switch 100a. Terminals 63 and 64 are attached to the switch 100c. Terminals 65 and 66 are attached to the switch 100d. As already mentioned, a terminal 40 is attached to the switch 100. Each switch-to-switch connection is organized by one or more physical links (network cables), as is each switch-to-terminal connection.

The network of switches 100, 100a, 100b, 100c, and 100d delivers packets from source terminal to destination terminal according to their specified address. Suppose, for example, that one terminal 61 has placed packets addressed to another terminal 63. These packets are forwarded by the switch 100a, switch 100, switch 100b, and switch 100c in that order before they reach the destination terminal 63.

Figure 3:
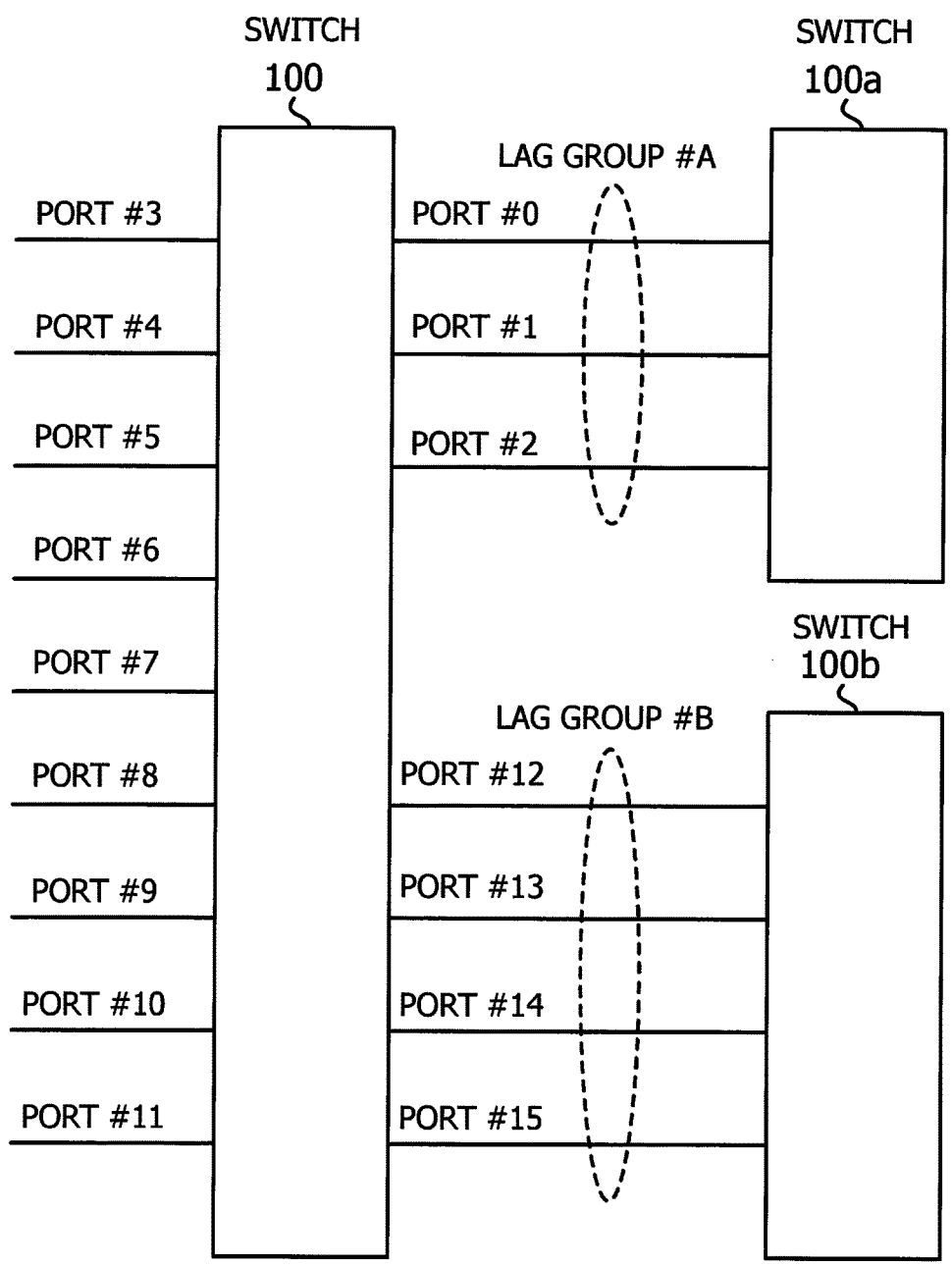
FIG. 3 illustrates LAG connections between switches.

FIG. 3 illustrates LAG connections between switches. According to the present embodiment, three switches 100, 100a, and 100b discussed in FIG. 2 are interconnected by LAG links as illustrated in FIG. 3. Specifically, the switch 100 is connected with a neighboring switch 100a via ports #0 to #2, which are physical ports belonging to LAG group #A. The switch 100 is also connected with another neighboring switch 100b via ports #12 to #15, which are physical ports belonging to LAG group #B. Other ports #3 to #11 of the switch 100 are connected to other switches (not illustrated). While not depicted specifically, port #0 of the switch 100 is actually constituted by an input port and an output port. The same applies to the other ports #1 to #11.

Figure 4:
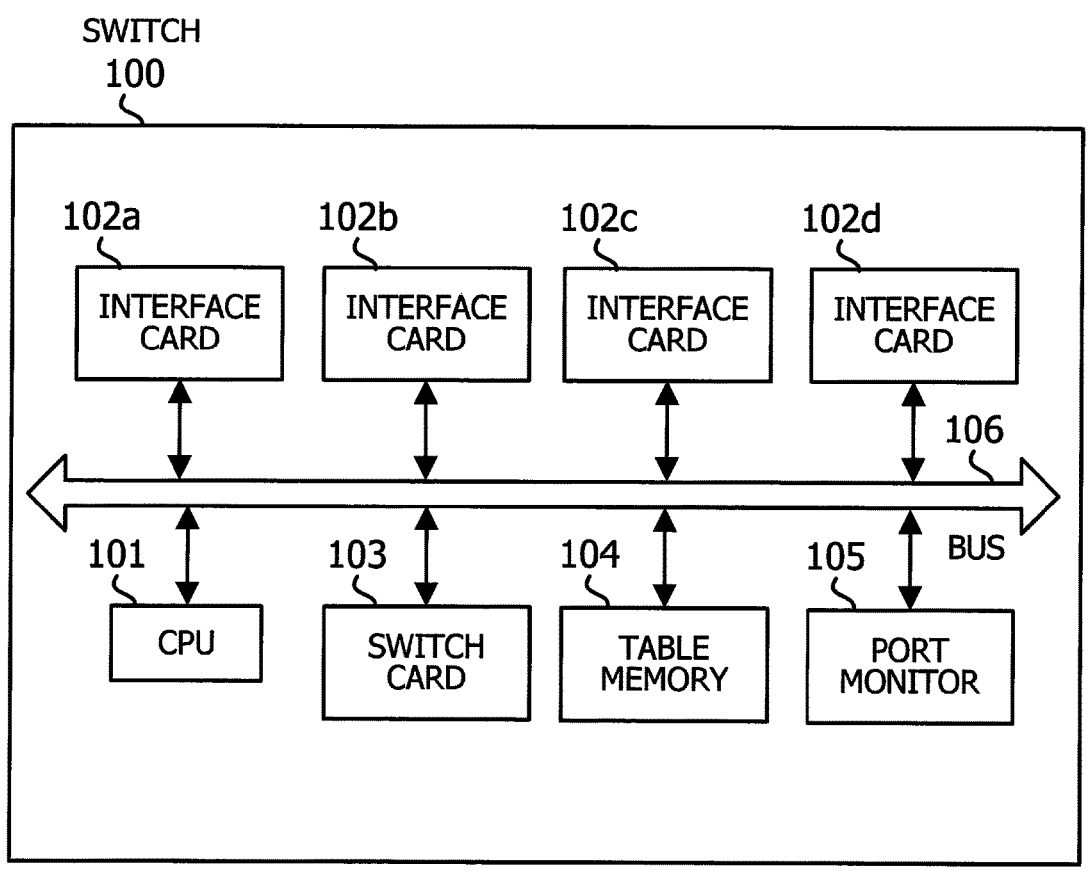
FIG. 4 illustrates a hardware configuration of a switch.

FIG. 4 illustrates a hardware configuration of a switch. More specifically, FIG. 4 illustrates an internal structure of the switch 100, which may similarly apply to other switches 100a, 100b, 100c, and 100d. The switch 100 includes a central processing unit (CPU) 101, interface cards 102a, 102b, 102c, and 102d, a switch card 103, a table memory 104, a port monitor 105, and a bus 106.

The CPU 101 controls the entire system of the switch 100 by executing software programs stored in a memory (not illustrated), together with data stored in the same. The CPU 101 receives and executes commands sent from an administrator terminal 40 via a communication interface (not illustrated) and sends the results back to the terminal 40.

The table memory 104 contains a plurality of tables to manage logical link configurations, determines the destination of packets in a logical link, and saves the records of packet destinations.

The bus 106 is used to connect the CPU 101, interface cards 102a, 102b, 102c, and 102d, switch card 103, table memory 104, and port monitor 105 with each other.

Each interface card 102a, 102b, 102c, and 102d provides a plurality of (e.g., eight) communication ports, which can each accommodate one physical link. The interface cards 102a, 102b, 102c, and 102d watch their ports to receive incoming packets. In preparation for concurrent arrival of packets at two or more communication ports, those interface cards 102a, 102b, 102c, and 102d have internal buffers as temporary storage of received packets. The interface cards 102a, 102b, 102c, and 102d supply the received packets to the switch card 103.

The switch card 103 includes a learning data table (not illustrated) to store source addresses of packets received in the past, together with the identifiers of communication ports or logical links through which the packets were received. This learning data table is updated by the switch card 103 as the need arises.

Upon receipt of a packet from the interface cards 102a, 102b, 102c, and 102d, the switch card 103 consults its learning data table to determine where to forward the received packet. In the case where the determined destination is a logical link, the switch card 103 selects a specific interface card and port for use in forwarding the packet, by consulting relevant tables stored in the table memory 104. The switch card 103 then sends the packet to the selected interface card.

Upon receipt of a packet from the switch card 103, the interface card 102a, 102b, 102c, and 102d transmits the packet from the selected communication port. The port monitor 105 monitors communication ports of the interface cards 102a, 102b, 102c, and 102d to detect a failure (and recovery therefrom) of a physical link connected to those ports. Upon detection of such an event, the port monitor 105 notifies the CPU 101 of that fact.

Figure 5:
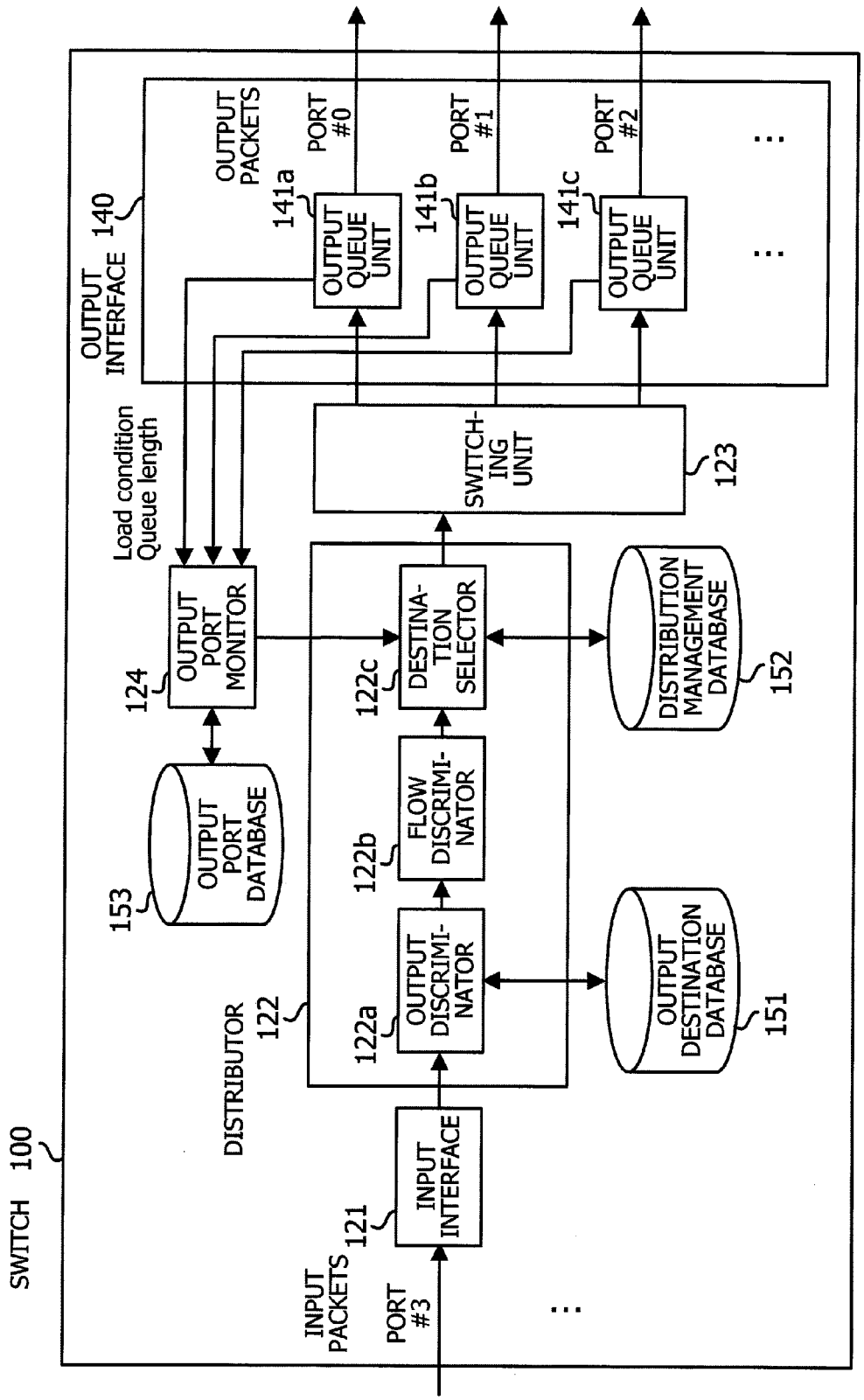
FIG. 5 is a block diagram of a switch according to a first embodiment.

FIG. 5 is a block diagram of a switch according to the first embodiment. While FIG. 5 depicts the functions of one switch 100, the other switches 100a, 100b, 100c, and 100d discussed in FIG. 2 also include similar elements and similar functions.

As can be seen from FIG. 5, the illustrated switch 100 transfers segmented data, or packets, via a logical link, or LAG, constituted by an aggregation of physical ports (simply "ports"). More specifically, the switch 100 includes the following elements: an input interface 121, a distributor 122, a switching unit 123, an output port monitor 124, an output interface 140, an output destination database 151, a distribution management database 152, and an output port database 153. The distributor 122 is formed from an output discriminator 122a, a flow discriminator 122b, and a destination selector 122c. The output interface 140 contains a plurality of output queue units 141a, 141b, 141c, . . . corresponding to individual output ports.

The input interface 121 provides connections to switches, terminals, information processing devices, or other type of apparatuses having communication functions via LAG or other type of network links. The input interface 121 has input ports (e.g., port #3) to receive a flow of packets containing segmented data from those devices. Those packets are to be forwarded to neighboring switches 100a, 100b, 100c, and 100d, terminals, and other communication apparatuses.

The distributor 122 determines which port is to be used to output the flow of packets received by the input interface 121, by consulting destination data stored in the output destination database 151, together with distribution management data stored in the distribution management database 152. Specifically, the distributor 122 selects an output port for the received packet flow from among the ports #0, #1, #2, . . . constituting a LAG group. The distributor 122 also relies on the output port monitor 124 to see how much load is imposed on each port. If an abnormal amount of load is found in a port, the distributor 122 changes its output port selection from the current output port to another port belonging to the same LAG group. To make this change, the distributor 122 compares the ports with each other in terms of the amount of buffer data stored in their corresponding output queue units and chooses the one with the largest amount of stored data.

As mentioned, the distributor 122 includes an output discriminator 122a, flow discriminator 122b, and destination selector 122c. The output discriminator 122a determines which ports may be used to output packets that the input interface 121 has received, based on their header information, together with destination data which has been produced from learning results of MAC address and stored in the output destination database 151. Instead of MAC address learning, the output discriminator 122a may rely on the IP address and routing protocol to determine the range of ports.

Specifically, this output discriminator 122a examines the destination MAC address of each packet of the received flow to determine to which output port those packets are supposed to go. More specifically, the output discriminator 122a extracts a MAC address from each packet of the received flow. The foregoing destination data associates this MAC address with a particular output port, which permits the switch 300 to determine the output port for the given packet flow.

Actually, the packets may be transmitted over aggregated links, rather than a single link. To support such packet flows using LAG, the destination data corresponding to a specific MAC address contains parameters that indicate the use of a LAG for the flow of packets having that address and enumerate output ports of that LAG group. According to such destination data, the output discriminator 122a determines to which LAG group the given packet flow is to be directed.

When LAG is in operation, the flow discriminator 122b identifies to which flow each received packet belongs, by examining its header information. The flow discriminator 122b produces a flow identifier for the received flow of packets based on their header information, by using a hash technique, such as the Secure Hash Algorithm 1 (SHA-1). In this operation, the flow discriminator 122b extracts header information from a packet and subjects the extracted header information to the hash operation.

Here the term "header" refers to, for example, a leading portion of a packet. The packet header actually contains various addresses used to determine from which terminal (or its group) the packet has been transmitted, and for which terminal (or its group) the packet is destined. A typical packet header includes source MAC address, destination MAC address, source Internet Protocol (IP) address, destination IP address, and other parameters.

The destination selector 122c uses the hash value calculated by the flow discriminator 122b to retrieve a relevant entry of distribution management data. Based on this distribution management data, the destination selector 122c determines which port to use to output packets. Also, to make efficient use of the bandwidth offered by a plurality of constituent ports of a LAG group, the destination selector 122c selects an output port out of the LAG group, based on the current state of LAG ports which is observed by the output port monitor 124 (described later).

The switching unit 123 directs packets to their output ports determined by the distributor 122. A packet flow entered to the switch 100 is thus retransmitted from output ports of the output interface 140 toward its destination, under the distribution control of the distributor 122.

The output port monitor 124 monitors each port of the output interface 140 in terms of congestion, load, failure, and other conditions and events regarding data traffic. For example, the output port monitor 124 watches the amount of data stored in the buffer of each output queue unit 141a, 141b, 141c, . . . and notifies the distributor 122 of its observations on each buffer, besides saving them as output port data in the output port database 153. To this end, the output port monitor 124 monitors the current queue length of each output port of LAG. The term "queue length" is used here to refer to the total amount of packet data awaiting transmission in each port. The output port monitor 124 also monitors the load condition of each port, which is, according to the present embodiment, observed as the total amount of packet data entered to an output queue unit during a given interval. The invention is, however, not limited to this configuration. For example, the output port monitor 124 may be configured to observe the long-term load of an output port by calculating a weighted sum of past load data of that port.

The output interface 140 provides a plurality of ports #0, #1, #2, . . . to transmit data. Also provided are output queue units 141a, 141b, 141c, . . . which include buffer storage for output data to be transmitted from the ports #0, #1, #2, . . . respectively. These output queue units 141a, 141b, 141c, . . . are what have been discussed as storage units in FIG. 1.

The output queue units 141a, 141b, 141c, . . . are associated with ports #0, #1, #2, of the output interface 140, respectively, for the purpose of controlling quality of data transmission. Packets may concurrently arrive at a plurality of ports (e.g., port #3) of the input interface 121 in the switch 100. The output queue units 141a, 141b, 141c, . . . adjust the retransmission timings of those packets by reading data from each buffer in a first-in first-out fashion.

The output destination database 151 stores destination data in the form of an output destination table 151a (described later in FIG. 6). This destination data indicates for which port (or for which LAG ports) each specific packet flow is destined.

The distribution management database 152 stores distribution management data in the form of a distribution management table 152a (described later in FIG. 7). In short, this distribution management data is a collection of records indicating output ports that the destination selector 122c has selected to transmit packet flows.

The output port database 153 stores output port data in the form of an output port table 153a (described later with reference to FIG. 8). This output port data describes, for example, the buffer queue length of each output port, congestion status and error status of output communication links, and other things.

The switch 100 has a plurality of (e.g., four) interface cards 102a, 102b, 102c, and 102d as illustrated in FIG. 4. These interface cards are identical in their functions and can operate as both input and output cards. For illustrative purposes, suppose that one interface card 102a serves as an input card to receive packets, and two interface cards 102b and 102c serve as output cards to transmit packets. In this case, one interface card 102a provides the functions of the foregoing input interface 121, distributor 122, and output port monitor 124, while other two interface cards 102b and 102c offer the functions of the foregoing output interface 140. With those functions of interface cards, the switch 100 forwards a received flow of packets to a subsequent switch or other device via communication links.

Each interface card 102a, 102b, 102c, and 102d has a plurality of ports to provide physical links. For example, the present embodiment uses a plurality of such multiple-port interface cards to offer the LAG capability, i.e., a logical link formed from multiple physical links, where each port serves as a physical link to communicate with a remote device. LAG is thus organized by a plurality of interface cards each having a plurality of ports.

According to the present embodiment, the foregoing functional blocks of the switch 100 operate as follows. Suppose, for example, that a flow of packets is entering port #3 of the input interface 121. The output discriminator 122a in the distributor 122 extracts header information from each received packet and retrieves corresponding data from the output destination table 151a stored in the output destination database 151. More specifically, the output discriminator 122a searches the output destination table 151a by using a MAC address found in the extracted header information as a search keyword and obtains a record (table entry) indicating output ports corresponding to the MAC address. The output discriminator 122a may use IP address, instead of MAC address, as a search keyword in the case where the switch 100 is an IP router or other IP-based device. When it is found that the received packets are supposed to be transmitted through a LAG, the output discriminator 122a subjects them to the flow discriminator 122b to identify their flow. The flow discriminator 122b calculates a hash of each packet's header information. The resulting hash values are used as flow identifiers in the subsequent processing.

Upon receipt of a flow of packets and its flow identifier, the destination selector 122c first consults the distribution management database 152 to check whether the distribution management table 152a contains an entry corresponding to the given flow. If the given packet flow is a new one (i.e., not found in the distribution management table 152a), the destination selector 122c selects an output port with the lightest load, based on the load condition information provided from the output port monitor 124. The destination selector 122c then directs the packets to the selected port, besides entering a record of that selection to the distribution management table 152a.

As the distribution management table 152a in its initial state contains no flow entries, the destination selector 122c assumes the received packet as the leading packet of a flow. Based on observations by the output port monitor 124, the destination selector 122c selects a lightest-loaded physical port from among those belonging to the LAG for the received packet flow, thus determining which output port to use to transmit the flow. The destination selector 122c updates the distribution management table 152a with the output port number of the selected port, together with the given flow identifier. The leading packet is then directed by the switching unit 123 to the selected port for transmission to the next switch.

Once a packet flow is registered with the distribution management table 152a, the destination selector 122c handles subsequent packets of that flow according to their corresponding entry of the distribution management table 152a. Specifically, the destination selector 122c consults the distribution management table 152a to find an output port assigned for those packets and then collects output port data describing the current condition of that output port from the output port monitor 124. Based on this output port data, the destination selector 122c determines whether the output port in question is experiencing congestion.

Unlike the case of leading packet, the destination selector 122c obtains a relevant output port number immediately from the distribution management table 152a. The obtained output port number is used to determine whether the corresponding port is congested. This determination of congestion is based on the load condition that the output port monitor 124 keeps monitoring. More specifically, an output port is found to be congested when its load equals or exceeds a specific threshold, and to be not congested when its load is below the threshold.

The output port monitor 124 monitors each port at regular intervals and saves the monitoring result in an output port table 153a. This record is referred to as output port data. The output port monitor 124 also sends this data to the distributor 122 as necessary.

The switch 100 handles subsequent packets of the flow in the same way as the leading packet until they reach the destination selector 122c. Since an existing entry for those packets is found in the distribution management table 152a, the destination selector 122c then consults the output port data to determine the condition of their output port. If no congestion is indicated, the destination selector 122c simply forwards the packets to the output port via the switching unit 123. Accordingly, those packets are transmitted from the output port having a port number specified by the distribution management table 152a, as long as that output port is not congested. Under no congestion, the transmitted leading packet and subsequent packets maintain their original sequence since they are transmitted according to the same record of the distribution management table 152a.

When the registered output port is in congestion, the destination selector 122c tries to find an alternative port in the same LAG group. Specifically, the destination selector 122c seeks an output port which is loaded lighter than the currently registered output port, and whose queue length is longer than that of the currently registered output port. If there is a port satisfying those criteria, the destination selector 122c modifies a relevant record of the distribution management table 152a to replace the current output port number with a new port number for the given packet flow, thus directing subsequent packets to the new output port. If there are no such qualified ports, the destination selector 122c maintains the present record of the distribution management table 152a, thus directing packets to the currently registered output port, just as in the case of no congestion.

That is, when the currently registered output port is found to be congested, the destination selector 122c seeks an alternative output port from among the same group of LAG ports. This alternative port has not only to be loaded lighter, but also to have a longer queue length, compared with the currently registered output port. If it fails to find such a port satisfying both of those criteria, the destination selector 122c forwards subsequent packets according to the distribution management table 152a, just as in the non-congested case. If a fully qualified port is found, the destination selector 122c changes the output port for the present packet flow to the port that is found (in the case where there are two or more such qualified ports, the lightest-loaded port is selected). Based on this change, the destination selector 122c updates the corresponding entry of the distribution management table 152a so as to associate the flow identifier of the present packet flow with the port number of the newly selected output port. Now that the distribution management table 152a is updated, subsequent packets arriving at the switch 100 are directed to the newly selected physical port through the switching unit 123 and sent out of that port.

As can be seen from the above description, the present embodiment avoids concentration of data traffic by changing the selection of output ports for outgoing packets, from the current congested physical port to a new lighter-loaded physical port found in the same group of LAG ports. Further, the present embodiment is designed to select a physical port having a longer queue of packets for use as a new output port. The difference of queue lengths between the current port and new port ensures that newly arriving packets of the same flow will be transmitted from the switch 100 after all the preceding packets in a queue are transmitted. This feature of the present embodiment prevents the order of packet flow from being disturbed. Accordingly, the present embodiment makes it possible to move congested port traffic to other ports without spoiling the quality of communication, and thus achieves efficient use of LAG bandwidth.

FIG. 6 illustrates an example data structure of a destination table. The illustrated output destination table 151a of FIG. 6 may be produced autonomously through a process of MAC address learning. Or alternatively, an output destination table 151a may be prepared in a table memory 104 (FIG. 4) by, for example, an administrator of the switch 100. Here the table memory 104 functions as the foregoing output destination database 151 (FIG. 5).

The output destination table 151a indicates which links may be used to output each specific flow of data when it is received by the switch 100. To this end, the output destination table 151a is formed from the following data fields: an "ENTRY" field containing an identifier of a data flow; a "LAG" field indicating whether the flow uses a LAG as its output links; and a "PORT" field indicating which links to use to output the flow. The field values arranged in the horizontal direction are associated with each other, thus constituting a single record.

Specifically, the ENTRY field contains a MAC address of a destination network device (e.g., neighboring switch 100a illustrated in FIG. 3), which serves as an identifier of a particular flow. While the output destination table 151a of FIG. 6 stores MAC address in the ENTRY field, the embodiments are not limited to this specific configuration. For example, the output destination table 151a may be configured to store an IP address in the case where the switch 100 is implemented as a layer-3 switch. In this case, the output destination table 151a may be produced autonomously through a learning process according to the IP routing protocols, or may be prepared by an administrator of the switch 100.

The LAG field contains a flag indicating whether the flow uses a logical link for its transmission. Specifically, the LAG field is set to "1" when the destination of the flow is LAG. Otherwise, the LAG field is set to "0".

The PORT field contains a port number representing which link (port) is used to transmit the flow. In the case where a LAG is used to transmit the flow, the PORT field specifies a plurality of ports constituting that LAG by enumerating their port numbers. In the case where the flow is transmitted through a non-LAG link, the PORT filed indicates a single port number representing the output port of the flow.

More specifically, the PORT field is formed from a plurality of subfields corresponding to individual port numbers. When the LAG field is set to "1" to indicate the use of LAG, two or more of those subfields contain "1" to indicate that their corresponding output ports constitute a LAG for the flow. According to the output destination table 151a illustrated in FIG. 6, the topmost record indicates that its corresponding flow of packets is supposed to be transmitted through a LAG, and more specifically, through one of three ports #0, #1, and #2 constituting that LAG.

FIG. 7 illustrates an example data structure of a distribution management table according to the first embodiment. The illustrated distribution management table 152a of FIG. 7 is prepared in a table memory 104 (FIG. 4) by, for example, an administrator of the switch 100. Here the table memory 104 functions as the foregoing distribution management database 152 (FIG. 5).

The distribution management table 152a describes which port in LAG is used to transmit each flow. To this end, the distribution management table 152a has the following data fields: "FLOW IDENTIFIER," "OUTPUT PORT NUMBER," and "LAST ENTRY." Briefly, the FLOW IDENTIFIER field contains information used to find an output port for a specific data flow. The OUTPUT PORT field contains a port number that indicates which port is currently used to output the flow. The LAST ENTRY field indicates when the last packet of the flow was entered to the switch 100. The field values arranged in the horizontal direction are associated with each other and thus constitute a single record.

Specifically, the FLOW IDENTIFIER field stores a flow identifier that associates a specific incoming flow to the switch 100 with its output port. More specifically, a hash value calculated from the destination address of a flow (see ENTRY field in FIG. 6) is used as a flow identifier. The OUTPUT PORT NUMBER field stores information that identifies an output port of LAG for the flow. More specifically, this field contains a port number identifying a specific output port. The LAST ENTRY field stores a timestamp indicating when the last packet of the flow was entered to the switch 100.

FIG. 8 illustrates an example data structure of an output port table according to the first embodiment. The illustrated output port table 153a of FIG. 8 is prepared in a table memory 104 (FIG. 4) by, for example, an administrator of the switch 100. Here the table memory 104 functions as the foregoing output port database 153 (FIG. 5). The output port table 153a describes what the output port monitor 124 has been provided as monitoring results of the ports constituting each LAG in the switch 100. To this end, the output port table 153a provides a PORT field to identify each LAG port, a LOAD field to indicate the amount of load imposed on each port, a QUEUE LENGTH field to indicate the queue length of each port; and a STATUS field to indicate congestion or failure, if any, of each port. The field values arranged in the horizontal direction are associated with each other and thus constitute a single record.

More specifically, each record of the output port table 153a corresponds to a specific LAG port in the switch 100, the port being identified by a port number stored in its PORT field. The LOAD field contains data indicating the load condition of that port, which may be, for example, the total amount of data entered to the output queue unit of that port in a specific duration of time. The QUEUE LENGTH field indicates the length of a queue in the foregoing output queue unit (FIG. 5), which may be, for example, the amount of data accumulated in a buffer of the port. The STATUS field contains, for example, a text string that describes a port status such as "CONGESTED" indicating congestion, "NORMAL" indicating the absence of problems, and "FAILED" indicating the occurrence of a failure.

Figure 9:
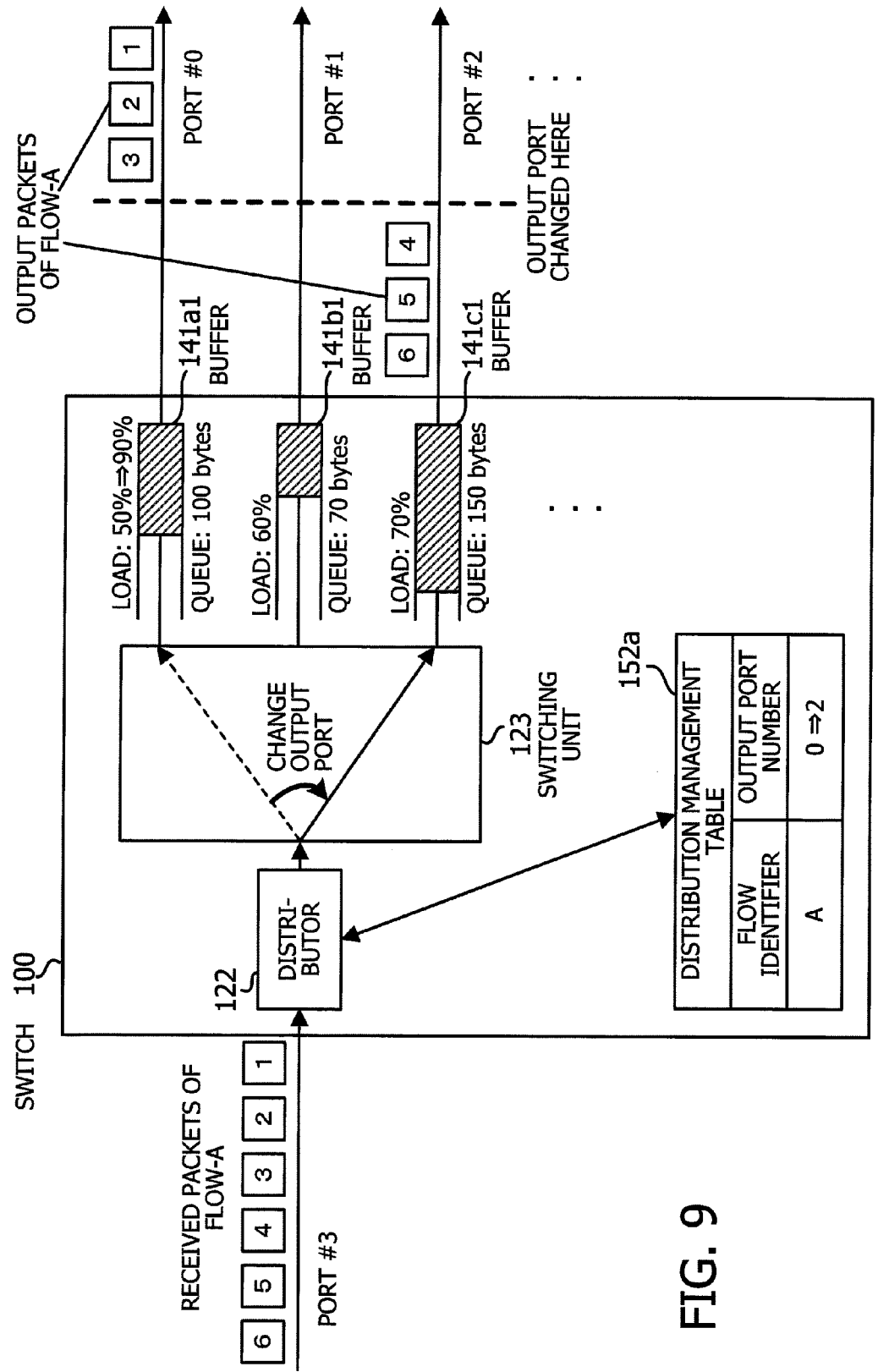
FIG. 9 illustrates a state of the switch according to the first embodiment in the case where incoming packets are switched to a new output port in the middle of their flow.

The present embodiment changes the selection of output ports for a given data flow as follows. FIG. 9 illustrates a state of the switch 100 according to the first embodiment in the case where incoming packets are switched to a new output port in the middle of their flow.

Referring to FIG. 9, a packet flow with a flow identifier of "A" (referred to as "FLOW-A") arrives at port #3 of the switch 100. The square boxes represent individual packets of FLOW-A, each with a numeral indicating the sequence of packets. Upon receipt of the first packet, the distributor 122 tests whether the distribution management table 152a contains an existing entry for the received FLOW-A, as discussed earlier in FIG. 5. As a result of this test, the received packet is found to be the leading packet of FLOW-A. The distributor 122 then determines which output port to use to transmit FLOW-A, based on observations by the output port monitor 124. Specifically, the distributor 122 chooses the lightest-loaded port out of those belonging to the LAG of FLOW-A. The example of FIG. 9 assumes that port #0 is the choice. In this case, the distribution management table 152a obtains a new entry that associates output port number "0" with flow identifier "A." After this output port registration with the distribution management table 152a, the received leading packet of FLOW-A is directed to port #0 through the switching unit 123 and transmitted from that port.

The second packet of FLOW-A, when arrived at the switch 100, is also processed in the same way as the first packet was done, except that the distribution management table 152a now offers an existing entry for FLOW-A. Accordingly, the destination selector 122c recognizes the received second packet as a subsequent packet of FLOW-A. Unlike the case of the leading packet, the distributor 122 obtains an output port number for the second packet from the distribution management table 152a and then checks whether the specified output port is congested. Congestion of a port is detected when the foregoing output port monitor 124 (FIG. 5) observes a certain amount of excessive load on the port.

When the load is below a given threshold level, the port is considered to be in non-congested condition. If this is the case for the output port #0 specified in the distribution management table 152a, the distributor 122 selects and uses that port #0 to forward the second packet. Accordingly, the second packet is transmitted from the selected output port #0.

That is, under non-congested conditions, the leading packet and subsequent packets of a flow are transmitted without disrupting their original sequence, from the same port specified by a record which has been created in the distribution management table 152a upon receipt of the leading packet. Referring again to the example of FIG. 9, the third packet of FLOW-A is directed to port #0 similarly to the second packet, assuming that the port is still in non-congested condition.

Suppose now that the load on port #0 has risen to a critical level (e.g., 90%) when the fourth packet is received. The congestion of port #0 causes the distributor 122 to seek an alternative output port for FLOW-A from among other ports #1, #2, . . . constituting the LAG of FLOW-A, based on observations by the output port monitor 124. As discussed in FIG. 5, this new output port is supposed to be loaded lighter than the current output port #0 and have a queue length longer than the queue length (e.g., 100) of the current output port #0. If there is found a port satisfying both conditions, the distributor 122 assigns that port as a new output port. If not found, the distributor 122 outputs the packet according to the current distribution management table 152a just as in the non-congested case.

In the example of FIG. 9, the load of port #0 has increased from 50% to 90% and its associated buffer now contains a queue of 100 bytes. Port #1, on the other hand, is operating at a load of 60% and its associated buffer 141b1 contains a queue of 70 bytes. Port #2 is operating at a load of 70% and its associated buffer 141c1 contains a queue of 150 bytes. Since port #2 satisfies both the above-noted conditions, the distributor 122 assigns port #2 as a new output port for FLOW-A, thus updating the relevant record of the distribution management table 152a to associate the flow identifier "A" with the new port number "2." Now that the distribution management table 152a has been updated, the fifth and sixth packets subsequent to the update are directed to the newly selected output port #2 through the switching unit 123 and transmitted from that port unless there is a significant change in the status of ports.

As can be seen from the above description, the present embodiment changes output port selection when congestion is detected in the port currently selected for received packets. The present embodiment chooses a lighter-loaded port as a new port, from among those constituting a LAG so as to avoid concentration of data traffic. The present embodiment also seeks a new port having a longer queue so as to ensure that the subsequent packets (e.g., the fourth to sixth packets illustrated in FIG. 9) be transmitted from the switch 100 after the preceding packets (e.g., the first to third packets in FIG. 9). This feature prevents the order of packets from being disturbed.

With the above-described components, the switch 100 of the present embodiment performs a method described below.

Figure 10:
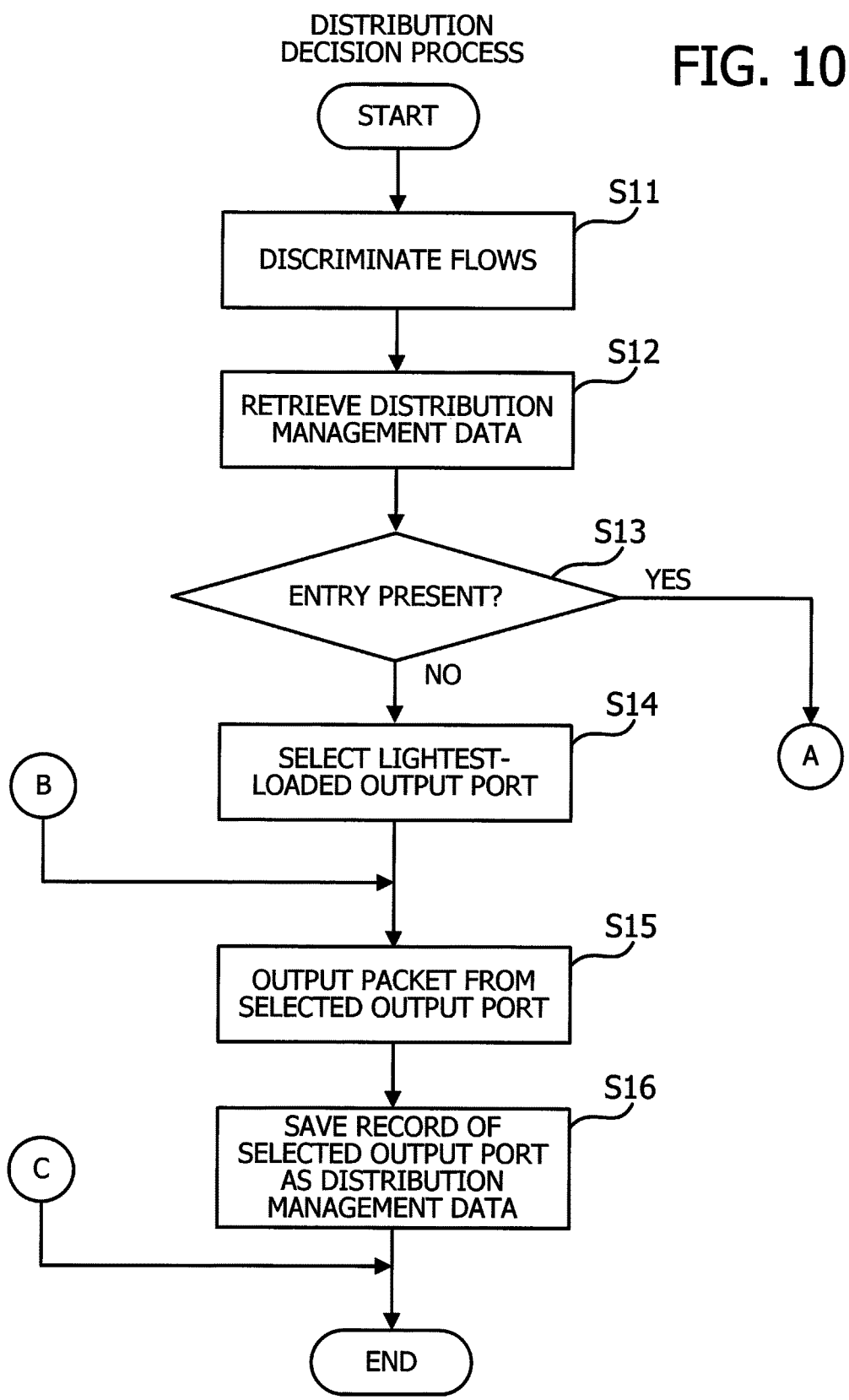
FIGS. 10 and 11 are a flowchart of a process of making distribution decisions according to the first embodiment.
Figure 11:
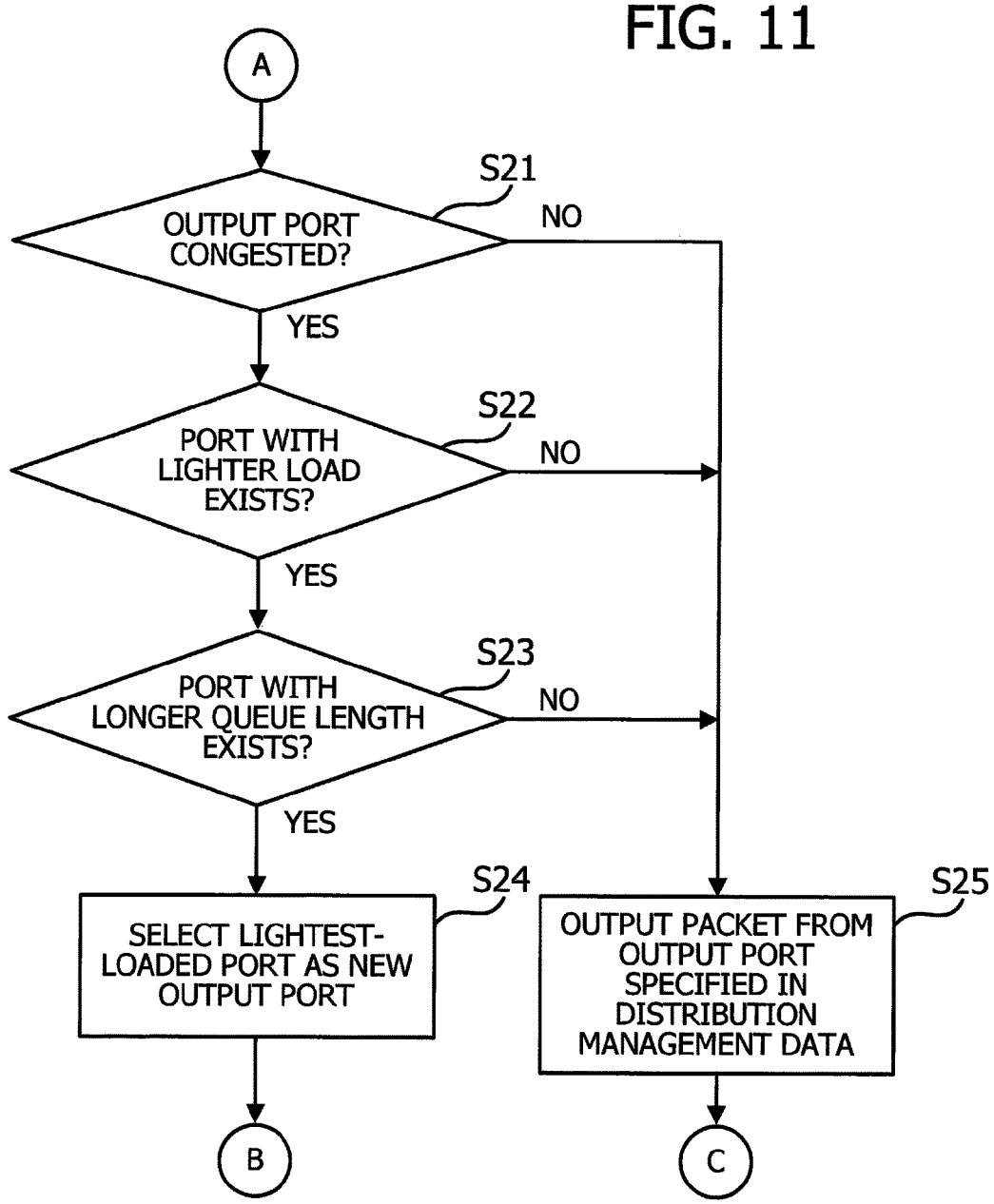

FIGS. 10 and 11 are a flowchart of a process of making distribution decisions according to the first embodiment. This process is to choose an appropriate output port from among those constituting a LAG and output a flow of packets from the selected output port. As described earlier in FIG. 5, the input interface 121 receives a packet arriving at the switch 100. By consulting the output destination table 151a (FIG. 6) stored in the output destination database 151, the output discriminator 122a determines whether the received packet is supposed to be transmitted via a LAG. If the determination result is positive, then the following process executes to make distribution decisions.

(Step S11) The flow discriminator 122b (FIG. 5) discriminates to which flow the received packet belongs, based on a flow identifier calculated by subjecting its header information to a hash algorithm.

(Step S12) The destination selector 122c (FIG. 5) retrieves distribution management data from the distribution management table 152a (FIG. 7) stored in the distribution management database 152 (FIG. 5).

(Step S13) By comparing the flow identifier of step S11 with the distribution management data retrieved at step S12, the destination selector 122c determines whether there is an existing entry for the received packet flow. If there is, the process branches to step S21 (FIG. 11). If there are no such entries, the process advances to step S14.

(Step S14) Based on observations by the output port monitor 124, the destination selector 122c selects a lightest-loaded output port from among those belonging to the LAG for the received packet flow, thus determining which output port to use to transmit the flow.

(Step S15) The destination selector 122c directs the received packet to the output port determined at step S14. The packet is thus transmitted from that port to a neighboring switch or the like.

(Step S16) The destination selector 122c updates the distribution management table 152a in the distribution management database 152 to register the output port determined at step S14 as a new piece of distribution management data. The process is thus completed.

(Step S21) Based on observations by the output port monitor 124, the destination selector 122c determines whether the output port currently selected for the received packet flow is congested. If the port is found to be congested, the process advances to step S22. If not, the process proceeds to step S25.

(Step S22) Based on observations by the output port monitor 124, the destination selector 122c examines each LAG port for the packet flow to determine whether there are any other output ports whose load are smaller than that of the current output port. If there are, then the process advances to step S23. If not, the process proceeds to step S25.

(Step S23) Based on observations by the output port monitor 124, the destination selector 122c further examines the ports qualified at step S22 to determine whether any of them has a longer queue than the current output port. If there are such ports, the process advances to step S24. If not, the process proceeds to step S25.

(Step S24) The destination selector 122c now selects the lightest-loaded output port from among those satisfying the condition of step S23, thus determining which output port to use to transmit the given packet flow. The process then proceeds to step S15 (FIG. 10).

(Step S25) The destination selector 122c consults the distribution management database 152 to retrieve relevant distribution management data from its distribution management table 152a. The destination selector 122c directs the received packet to an output port specified in the retrieved distribution management data. The packet is thus transmitted from that port to a neighboring switch or the like, and the process is completed.

According to the above-described first embodiment, the distributor 122 may change its output port selection for a given flow to another port upon receipt of another packet of the same flow. In this case, the received packet (as well as its subsequent packets) is transmitted from the newly selected port. The embodiment is, however, not limited to this configuration. For example, the distributor 122 may also be configured to use the current output port to transmit the packet that has caused the change, while saving the newly selected output port for later packets of the flow.

As can be seen from the above description, the first embodiment uses a plurality of output ports more effectively to distribute data, thus enabling more efficient forwarding of data.

Variation of the First Embodiment

This section will describe a variation of the foregoing first embodiment. Here the first embodiment is modified such that the output port monitor will evaluate the queue length of each output port, taking into account the difference of their transmission rates. The following description will focus on its distinctive points, while affixing like reference numerals to like elements in FIG. 1.

The foregoing first embodiment assumes that all output ports of the switch 100 operate at the same transmission rates. The modified version of the switch 100 changes the assignment of output ports with different transmission rates.

Figure 12:
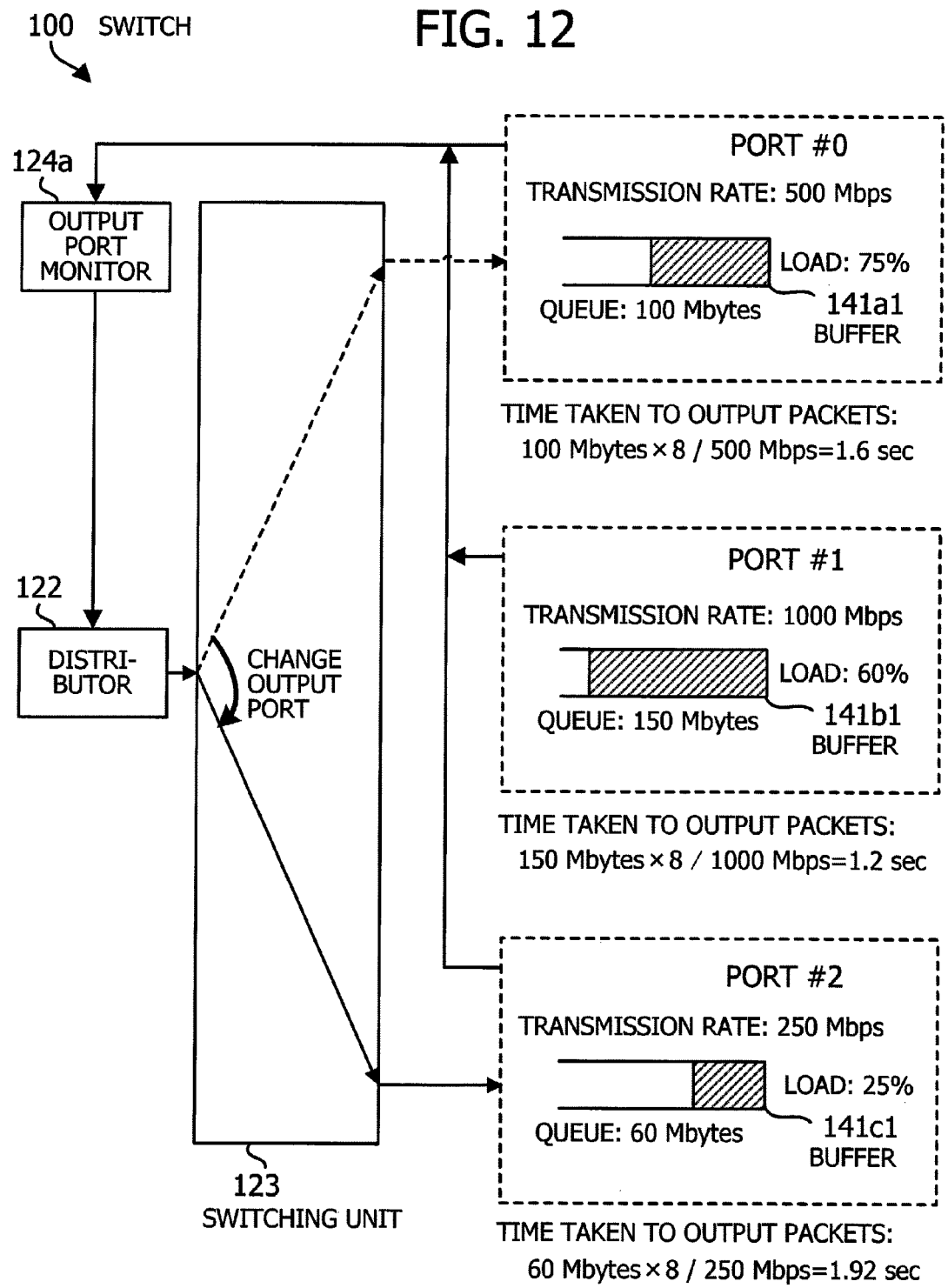
FIG. 12 illustrates a state of a switch according to a variation of the first embodiment in the case where incoming packets are switched to a new output port in the middle of their flow.

FIG. 12 illustrates a state of a switch according to a variation of the first embodiment in the case where incoming packets are switched to a new output port in the middle of their flow. It is assumed in FIG. 12 that a LAG is organized by three ports #0, #1, and #2 of the switch 100, which transmit data at the rates of 500 megabits per second (Mbps), 1000 Mbps, and 250 Mbps, respectively.

Unlike the original first embodiment, the output port monitor 124a evaluates the load on the buffers 141a1, 141b1, and 141c1 according to their amount of stored data and transmission rate. More specifically, the load status of a specific port is quantified by dividing the amount of data stored in its buffer 141a1, 141b1, or 141c1 by the transmission rate of the port.

Suppose now that the distributor 122 has selected port #0 for a specific packet flow, and the switching unit 123 is thus sending packets to that port #0. The switch 100 continues to receive subsequent packets of the flow, and the output port monitor 124a observes congestion of the current output port #0, while the other ports #1 and #2 are still under a light load, relative to port #0. Suppose that the buffer 141a1 of port #0 stores queued data of 100 Mbytes. Similarly, the buffer 141b1 of port #1 stores 150 Mbytes, and the buffer 141c1 of port #2 stores 60 Mbytes.

In the above situation, the distributor 122 changes the output port for the current flow from port #0 to a new port, as in the first embodiment. According to the present variation, this new port is selected as follows. When the ports have different transmission rates as illustrated in FIG. 12, the output port monitor 124a calculates the time required to entirely transmit the data stored in a port buffer by dividing its queue length by the transmission rate of the port. For example, port #0 stores 100 Mbytes of queued data awaiting transmission at 500 Mbps. Accordingly, the calculation will be:

100 Mbytes×8 bits/500 Mbps=1.6 seconds

Likewise, port #1 needs 1.2 seconds, and port #2 needs 1.92 seconds.

The distributor 122 uses the above calculation results, rather than the queue lengths per se, to determine whether to choose a new output port. As a result, the distributor 122 chooses port #2 as a new output port because its time value, 1.92 seconds, is greater than 1.6 seconds of the current output port #0. Note that the selected port #2 also has a longer queue than the current output port #0.

While the present variation converts a queue length into a time duration by dividing it by transmission rate, it may also be possible to use other methods to compare the ports having different transmission rates with each other. For example, the distributor 122 may divide the transmission rate of a port by the queue length of its buffer, or may use some other factors that are proportional to transmission rates and queue lengths.

The first embodiment can be modified in the way described above so as to evaluate the status of output ports under a unified criterion based on the time required to transmit data. Even in the case where the ports operate at different transmission rates, this feature enables effective distribution of data to those ports, thus making more efficient forwarding of data possible.

Second Embodiment

This section will describe a second embodiment. Since the second embodiment shares some elements with the foregoing first embodiment, the following description will focus on its distinctive points, while affixing like reference numerals to like elements.

The second embodiment is different from the first embodiment in its additional feature of monitoring port failure and buffer occupancy for the purpose of output port selection. Another difference is that the second embodiment does not change the output port selection for a specified time after a previous change. Yet another difference is that the second embodiment deletes distribution management data of packet flows.

Figure 13:
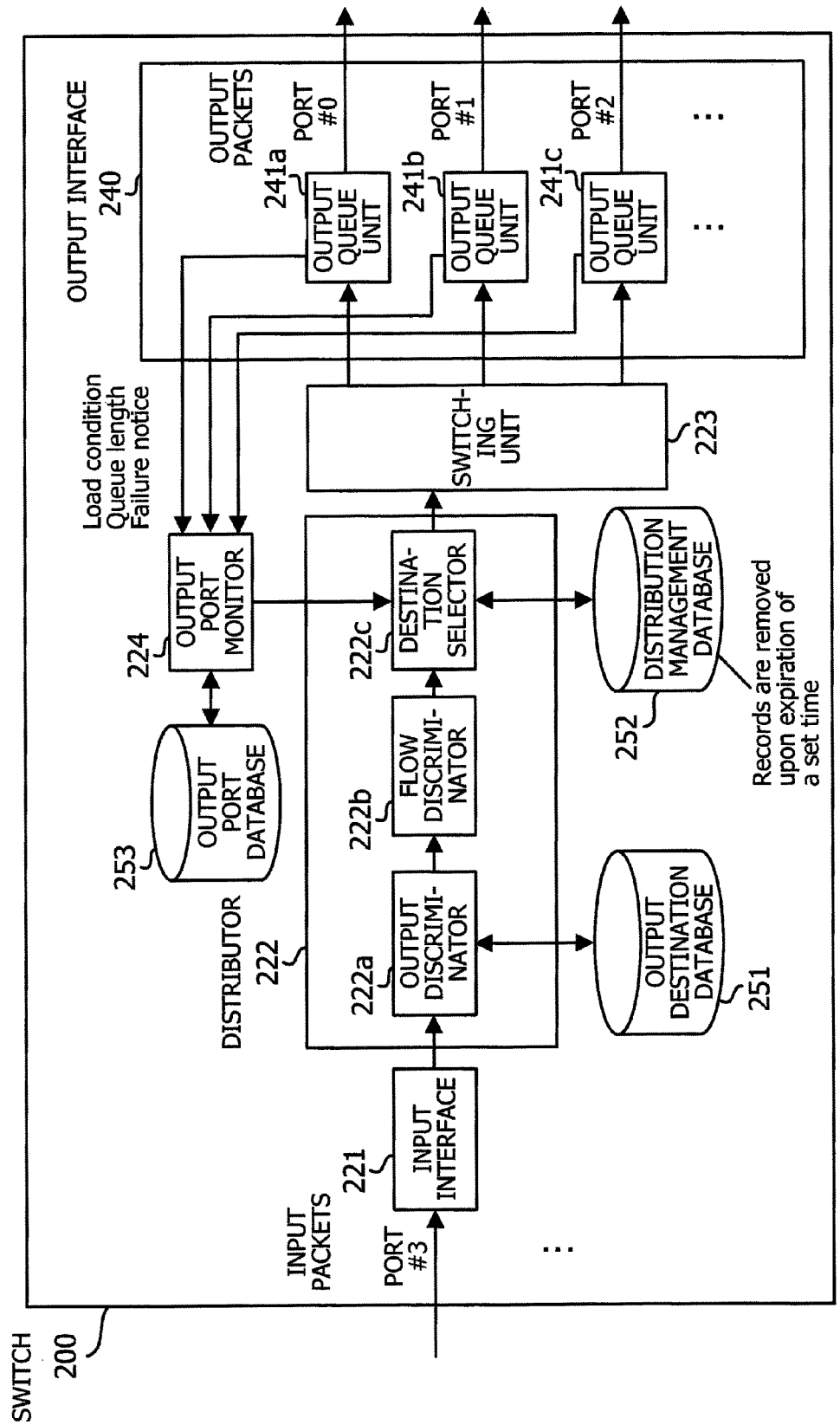
FIG. 13 is a block diagram of a switch according to a second embodiment.

FIG. 13 is a block diagram of a switch according to the second embodiment. As can be seen from FIG. 13, the illustrated switch 200 transfers packets carrying segmented data via a logical link, or LAG, constituted by an aggregation of ports. To this end, the switch 200 includes an input interface 221, a distributor 222, a switching unit 223, an output port monitor 224, an output interface 240, an output destination database 251, a distribution management database 252, and an output port database 253. The distributor 222 includes an output discriminator 222a, a flow discriminator 222b, and a destination selector 222c. The output interface 240 contains a plurality of output queue units 241a, 241b, 241c, . . . corresponding to individual output ports.

The input interface 221 provides connections to switches, terminals, information processing devices, or other type of apparatuses having communication functions via LAG or other type of network links. The input interface 221 has input ports (e.g., port #3) to receive a flow of packets containing segmented data from those devices. Those packets are to be forwarded to neighboring switches, terminals, and other communication apparatuses.

The distributor 222 determines which port is to be used to output the flow of packets received by the input interface 221, with reference to destination data stored in the output destination database 251 and distribution management data stored in the distribution management database 252. Specifically, the distributor 222 selects an output port from among the ports #0, #1, #2, . . . constituting a LAG group for the received packet flow.

The distributor 222 also relies on the output port monitor 224 to see how much load is imposed on each port. If an abnormal amount of load is found in a port, the distributor 222 changes the destination of packets from the current output port to another port belonging to the same LAG group. To make this change, the distributor 222 compares the ports with each other in terms of the amount of buffer data stored in their corresponding output queue units and chooses the one with the largest amount of stored data.

Based on observation of the output port monitor 224, the distributor 222 selects a new output port for the received packet flow from among those other than the abnormally-loaded port. The distributor 222 also consults distribution management data in the distribution management database 252 to determine which port to use to output the flow. From this distribution management data, the distributor 222 obtains a time record indicating when the input interface 221 received the last packet of the flow. If the time record indicates passage of a certain time, the distributor 222 deletes the distribution management data of the flow.

The output queue units 241a, 241b, 241c, ... provide a data buffer corresponding to each output port. When selecting a new output port for the received packet flow, the distributor 222 examines the amount of data stored in each buffer, as well as the amount of vacancy remaining in each buffer. That is, the distributor 222 seeks an output port whose buffer contains more data than the buffer of the current output port and still has a vacancy that is greater than a specified threshold.

The distributor 222 is also designed to count how many times it has changed output ports for a given flow. If the number of such changes during a specified interval exceeds a specified threshold, the distributor 222 restricts itself from attempting further changes.

As mentioned, the distributor 222 includes an output discriminator 222a, flow discriminator 222b, and destination selector 222c. The output discriminator 222a determines which ports may be used to output packets that the input interface 221 has received, based on their header information, together with destination data which has been produced from learning results of MAC address and stored in the output destination database 251. Instead of MAC address learning, the output discriminator 222a may rely on the IP address and routing protocol to determine the range of ports.

Specifically, this output discriminator 222a examines the destination MAC address of each packet of the received flow to determine to which output port those packets are supposed to go. More specifically, the output discriminator 222a extracts a MAC address from a packet of the received flow. The foregoing destination data associates this MAC address with a particular output port, which permits the switch 200 to determine the output port for the given packet flow.

To support packet flows using LAG, the destination data corresponding to a specific MAC address contains parameters that indicate the use of a LAG for the flow of packets having that address and enumerate assigned output ports of that LAG group. According to such destination data, the output discriminator 222a determines to which LAG group the given packet flow is to be directed.

When LAG is in operation, the flow discriminator 222b identifies to which flow each received packet belongs, by using a flow identifier produced from header information of the packets. In this operation, the flow discriminator 222b extracts header information from a received packet and subjects the extracted header information to a hash algorithm to produce its flow identifier. The packet header (e.g., a leading portion of a packet) actually contains various addresses used to determine from which terminal (or its group) the packet has been transmitted, and for which terminal (or its group) the packet is destined. A typical packet header includes source MAC address, destination MAC address, source IP address, destination IP address, and other parameters.

The destination selector 222c uses the hash value calculated by the flow discriminator 222b to retrieve a relevant entry of distribution management data. Based on this distribution management data, the destination selector 222c determines which port to use to output packets. Also, to make efficient use of the bandwidth offered by a plurality of constituent ports of a LAG group, the destination selector 222c selects an output port out of the LAG group, based on the state of LAG ports monitored by the output port monitor 224 (described later).

The switching unit 223 directs packets to their output ports determined by the distributor 222. The packet flow entered to the switch 200 is thus retransmitted from output ports of the output interface 240 toward its destination, under the distribution control of the distributor 222.

The output port monitor 224 monitors each port of the output interface 240 in terms of congestion, load, failure, and other conditions and events regarding data traffic. For example, the output port monitor 224 watches the amount of data stored in the buffer of each output queue unit 241a, 241b, 241c, ... and notifies the distributor 222 of its observations on each buffer, besides saving them as output port data in the output port database 253. To this end, the output port monitor 224 monitors the current queue length of each output port of LAG, i.e., the total amount of packet data awaiting transmission in each port. The output port monitor 224 also monitors the load condition of each port, which is, according to the present embodiment, observed as the total amount of packet data entered to an output queue unit during a given interval. The invention is, however, not limited to this configuration. For example, the output port monitor 224 may be configured to observe the long-term load of an output port by calculating a weighted sum of past load data of that port.

In addition to the above functions, the output port monitor 224 also detects a failure of each port of the output interface 240. Upon detection, the output port monitor 224 saves a record of the detected failure as part of the output port data managed in the output port database 253, as well as notifying the distributor 222 of the failure.

The output port monitor 224 watches load condition of data transmitted from each port of the output interface 240. The output interface 240 provides a plurality of ports #0, #1, #2, ... to transmit data and their corresponding output queue units 241a, 241b, 241c, ... each including buffer storage for output data.

The output queue units 241a, 241b, 241c, ... are associated with ports #0, #1, #2, ... of the output interface 240, respectively, for the purpose of controlling quality of data transmission. Packets may concurrently arrive at a plurality of ports (e.g., port #3) of the input interface 221 in the switch 200. The output queue units 241a, 241b, 241c, ... adjust the retransmission timings of those packets by reading data from each buffer in a first-in first-out fashion. These output queue units 241a, 241b, 241c, ... are what have been discussed as storage units in FIG. 1.

The output destination database 251 stores destination data in the form of an output destination table 151a (described earlier in FIG. 6). This destination data indicates for which port (or for which LAG ports) each specific packet flow is destined.

The distribution management database 252 stores distribution management data in the form of a distribution management table 152a (FIG. 7). This distribution management data is a collection of records indicating output ports that the destination selector 222c has selected to transmit packet flows. Specifically, each record describes which output port was used to output a specific flow, as well as when the input interface 221 received the last packet of that flow.

The output port database 253 stores output port data in the form of an output port table 153a (FIG. 8). This output port data describes the current buffer queue length of each output port, congestion status and error status of output communication links, and other things.

With the above-described components, the present embodiment performs processing operations described below.

Figure 14:
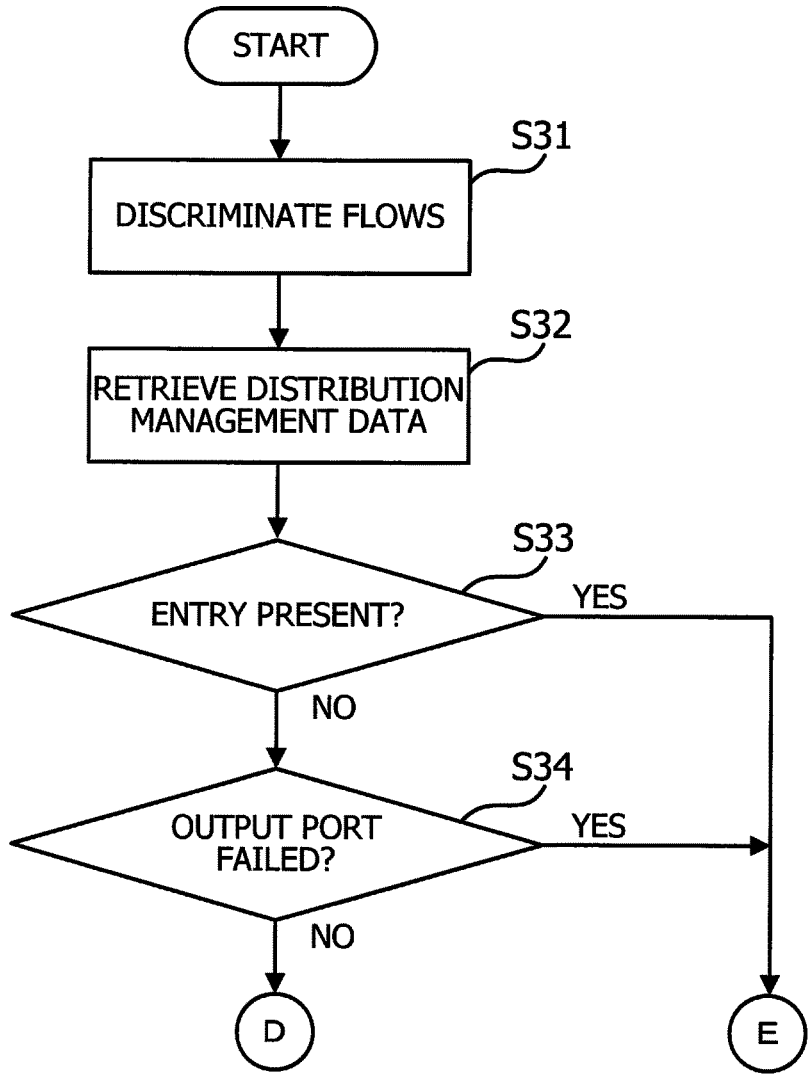
FIGS. 14 to 16 are a flowchart of a process of making distribution decisions according to the second embodiment.
Figure 15:
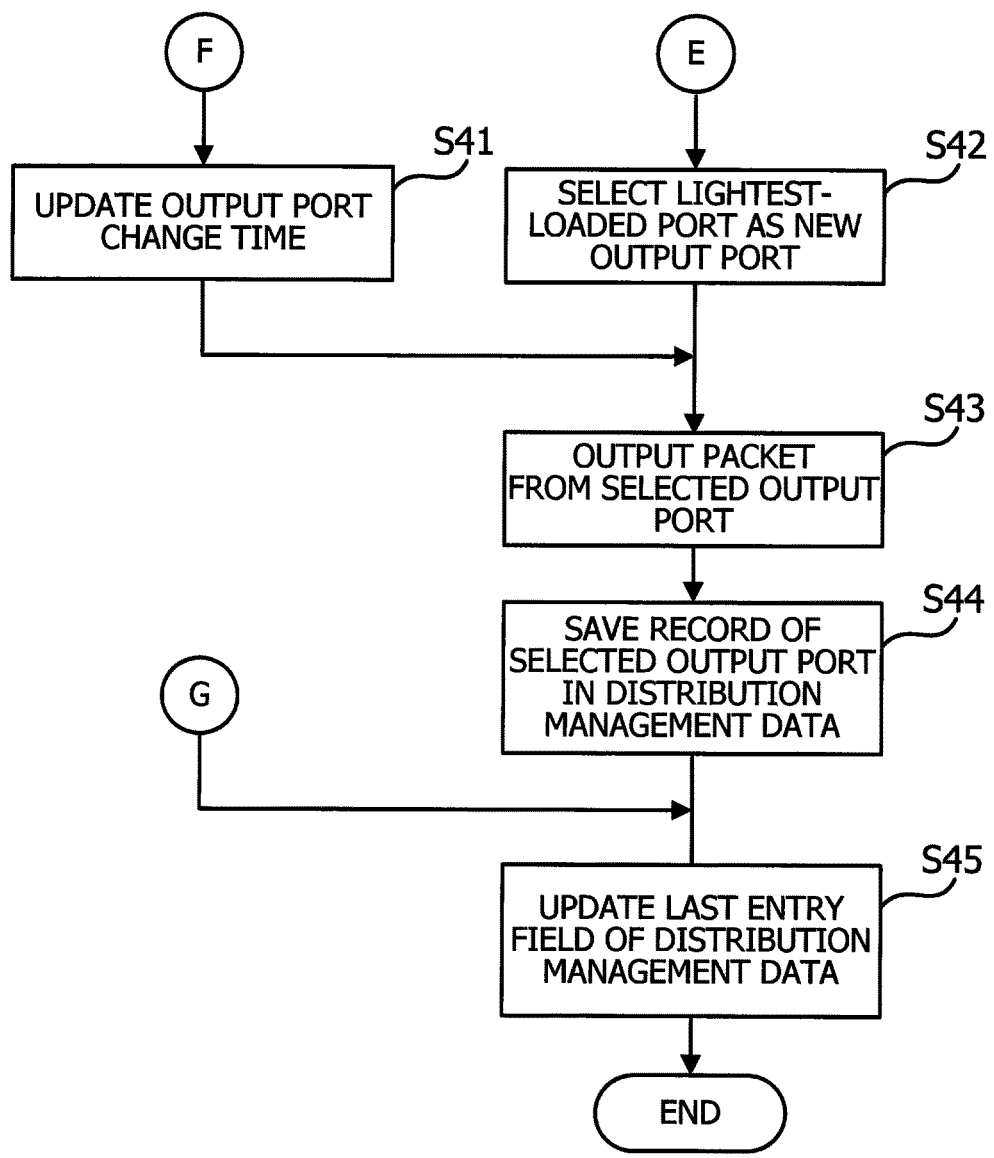
Figure 16:
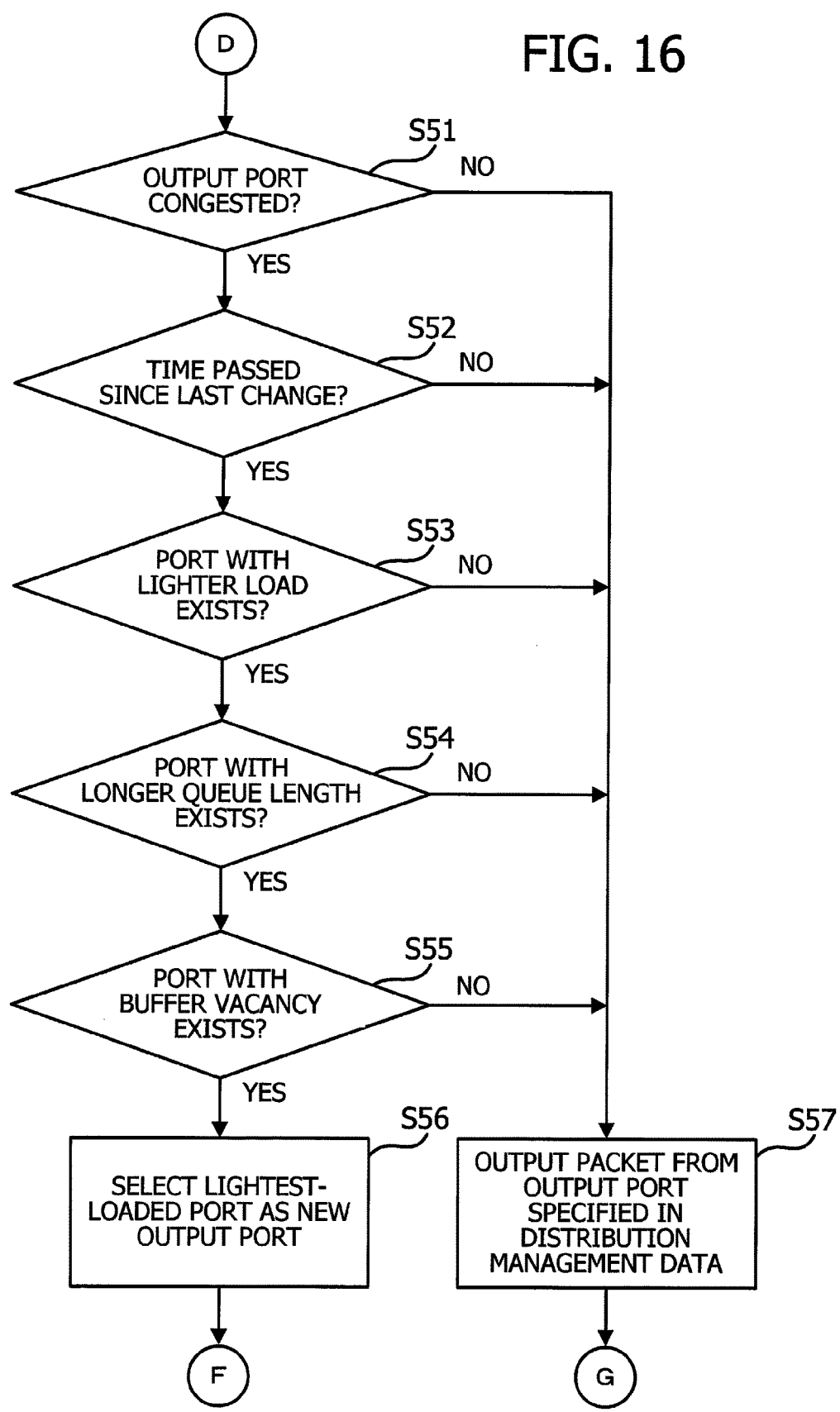

FIGS. 14 to 16 are a flowchart of a process of making distribution decisions according to the second embodiment. This process is to choose an appropriate output port from among those constituting a LAG and output a flow of packets from the selected output port. As described earlier in FIG. 13, the input interface 221 receives a packet arriving at the switch 200. By consulting the output destination table 151a (FIG. 6) stored in the output destination database 251, the output discriminator 222a determines whether the received packet is supposed to be transmitted via a LAG. If the determination result is positive, then the following process executes to make distribution decisions.

(Step S31) The flow discriminator 222b (FIG. 13) discriminates to which flow the received packet belongs, based on a flow identifier calculated by subjecting its header information to a hash algorithm.

(Step S32) The destination selector 222c (FIG. 13) retrieves distribution management data from the distribution management table 152a (FIG. 7) stored in the distribution management database 252 (FIG. 13).

(Step S33) By comparing the flow identifier of step S31 with the distribution management data retrieved at step S32, the destination selector 222c determines whether there is an existing entry for the received packet flow. If there is, the process branches to step S42 (FIG. 15). If there are no such entries, the process advances to step S34.

(Step S34) Based on observations by the output port monitor 224, the destination selector 222c determines whether the output port currently selected for the received packet flow is encountering a failure. If so, the process advances to step S42. If not, the process proceeds to step S51 (FIG. 16).

When a port failure is observed in this step S34, the destination selector 222c proceeds to subsequent steps, assuming, for example, that the output port is loaded with its full capacity. Port failures include not only a failure of the output port itself, but also a failure of a communication link connected to that port.

(Step S41) Following the change of output port selection at step S56 (FIG. 16), the destination selector 222c updates the record of output port change time to indicate when the latest change was made.

This output port change time is managed with a timer in the CPU 101 (FIG. 4) of the switch 200. The output port change time indicates the last change made to the output port assignment concerning all flows that enter the switch 100. In other words, the output port change time is updated when any of those flows experiences a change. It is noted that the output port change time is only affected by a change made to the assignment of output ports, but not a setup of output ports (step S42) with no flow entry, because this function is intended to avoid too frequent changes of output ports.

(Step S42) Based on observations by the output port monitor 224, the destination selector 222c selects a lightest-loaded output port from among those belonging to the LAG for the received packet flow, thus determining which output port to use to transmit the flow.

(Step S43) The destination selector 222c directs the received packet to the output port determined at step S42. The packet is thus transmitted from that port to a neighboring switch or the like, (Step S44) The destination selector 222c updates the distribution management table 152a in the distribution management database 252 to register the output port determined at step S42 as a new piece of distribution management data.

(Step S45) The destination selector 222c makes access to the distribution management table 152a stored in the distribution management database 252 to update the LAST ENTRY field of distribution management data corresponding to the received packet flow, thus terminating the process.

(Step S51) Based on observations by the output port monitor 224, the destination selector 222c determines whether the output port currently selected for the received packet flow is congested. If the port is found to be congested, the process advances to step S52. If not, the process proceeds to step S57.

(Step S52) The destination selector 222c examines the output port change time (see step S41 of FIG. 15) to determine whether a specified time has passed since the previous change of output port selection. If so, the process advances to step the process advances to step S53. If not, the process proceeds to step S57.

(Step S53) Based on observations by the output port monitor 224, the destination selector 222c examines each LAG port for the packet flow to determine whether there are any other output ports whose load is smaller than that of the current output port. If there are, then the process advances to step S54. If not, the process proceeds to step S57.

(Step S54) Based on observations by the output port monitor 224, the destination selector 222c further examines the ports qualified at step S52 to determine whether any of them has a longer queue than the current output port. If there are such ports, the process advances to step S55. If not, the process proceeds to step S57.

(Step S55) Based on observations by the output port monitor 224, the destination selector 222c further examines the ports qualified at step S54 to determine whether any of them has a buffer vacancy not smaller than a specified amount. If there are such ports, the process advances to step S56. If not, the process advances to step S57.

(Step S56) The destination selector 222c now selects the lightest-loaded output port from among those qualified at step S53, thus determining which output port to use to transmit the given packet flow. The process then proceeds to step S41 (FIG. 15).

(Step S57) The destination selector 222c consults the distribution management database 252 to retrieve relevant distribution management data from its distribution management table 152a. The destination selector 222c directs the received packet to an output port specified in the retrieved distribution management data. The packet is thus transmitted from that port to a neighboring switch or the like.

Figure 17:
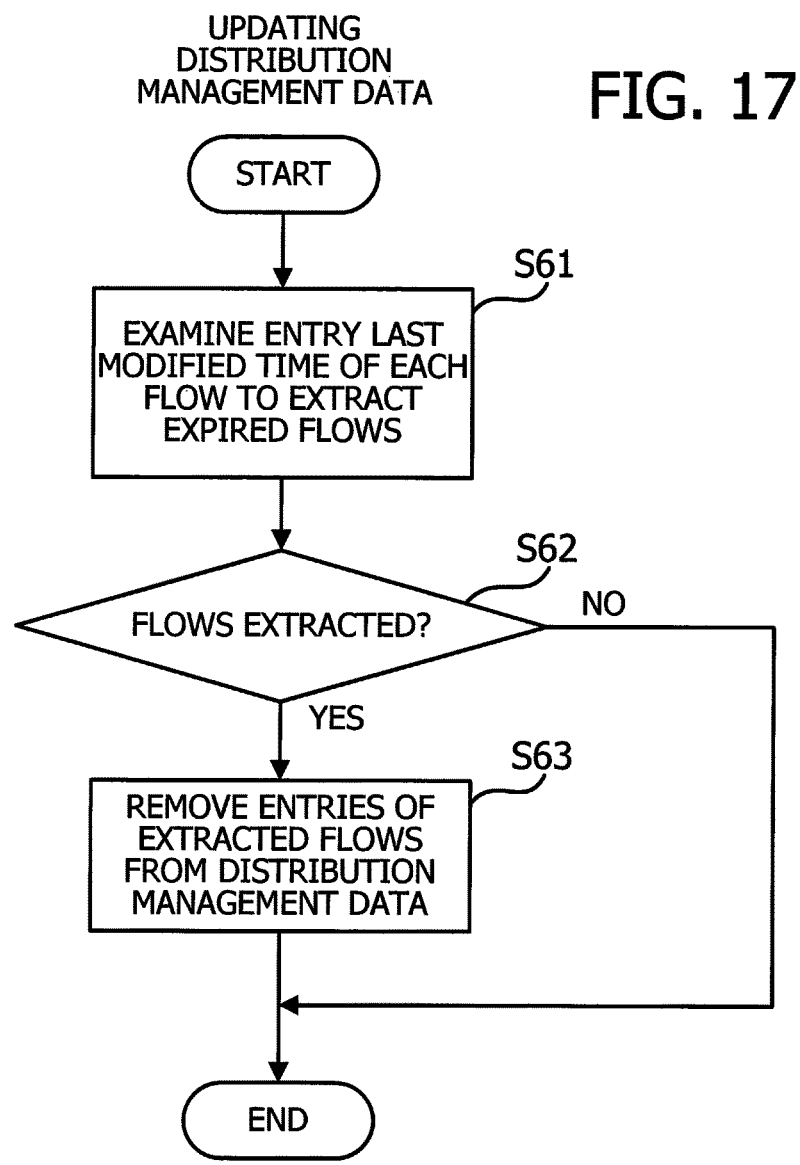
FIG. 17 is a flowchart of a process of updating distribution management data according to the second embodiment.

FIG. 17 is a flowchart of a process of updating distribution management data according to the second embodiment. This process updates distribution management data of a distribution management table 152a (FIG. 7) stored in the distribution management database 252 (FIG. 13) according to passage of time. More specifically, the distribution management data updating process deletes an entry of the distribution management table 152a if a specified time has passed since the time recorded in its LAST ENTRY field. For example, this process is triggered at predetermined regular intervals.

(Step S61) The destination selector 222c retrieves distribution management data out of the distribution management table 152a in the distribution management database 252. The destination selector 222c then determines whether any of the registered flows have expired (i.e., a specified time has passed since the time recorded in its LAST ENTRY field).

(Step S62) The destination selector 222c determines whether any flows have been extracted at step S61. If there is such a flow, the process advances to step S63. If not, the process is terminated.

(Step S63) Now that an expired flow is found at step S61, the destination selector 222c deletes that entry from the distribution management data, thus completing the process.

As can be seen from the above description of the second embodiment, the proposed switch 200 chooses a new output port, taking into account the capacity margin of a port buffer (e.g., a 10% vacancy of its maximum capacity) in addition to its load and queue length conditions. Besides avoiding the problem of buffer overflow, this feature of the second embodiment prevents the output ports from being changed too often, thus making it possible to use the available bandwidth more efficiently.

When the current output port encounters a failure, the second embodiment uses other ports in the same LAG group to deliver the subsequent packet correctly. To detect a failure of a port, the switch 200 may use the link aggregation control protocol (LACP). For example, the switch 200 monitors whether it receives LACP packets from remote devices at regular intervals. As another method of monitoring ports, the switch 200 may be configured to transmit packets for the purpose of failure detection.

An existing flow may lose its entry in the distribution management table 152a upon expiration of a specified time. When this happens, subsequent packets of that flow will be treated as a new flow. That is, the destination selector 222c assigns a port for the received packets based on the latest status of output ports, which enables more efficient distribution of packets. While those packets are of a single flow, the destination selector 222c sees them from a long-term viewpoint and thus renews the output port selection for each chunk of packets in the flow, depending on the latest load condition of output ports. This feature of the second embodiment enables more efficient use of the bandwidth of links.

The second embodiment takes a restrictive action at regular intervals against packet flows changing their output ports. This feature prevents a plurality of flows from choosing the same new port, thus negating the possibility of congestion of data traffic at a particular output port. Without this feature, the switch could experience increased load or burden due to too frequent changes of output port selection. This feature also prevents oscillating behavior of the switch in which a flow is repetitively switched among two or more particular ports.

The second embodiment also changes the output port selection in response to a failure found in a port or its associated communication link, thus ensuring correct delivery of subsequent packets of the flow. This feature prevents a flow from being entirely lost by such a failure.

Third Embodiment

This section will describe a third embodiment. Since the third embodiment shares some elements with the foregoing first embodiment, the following description will focus on its distinctive points, while affixing like reference numerals to like elements.

Figure 18:
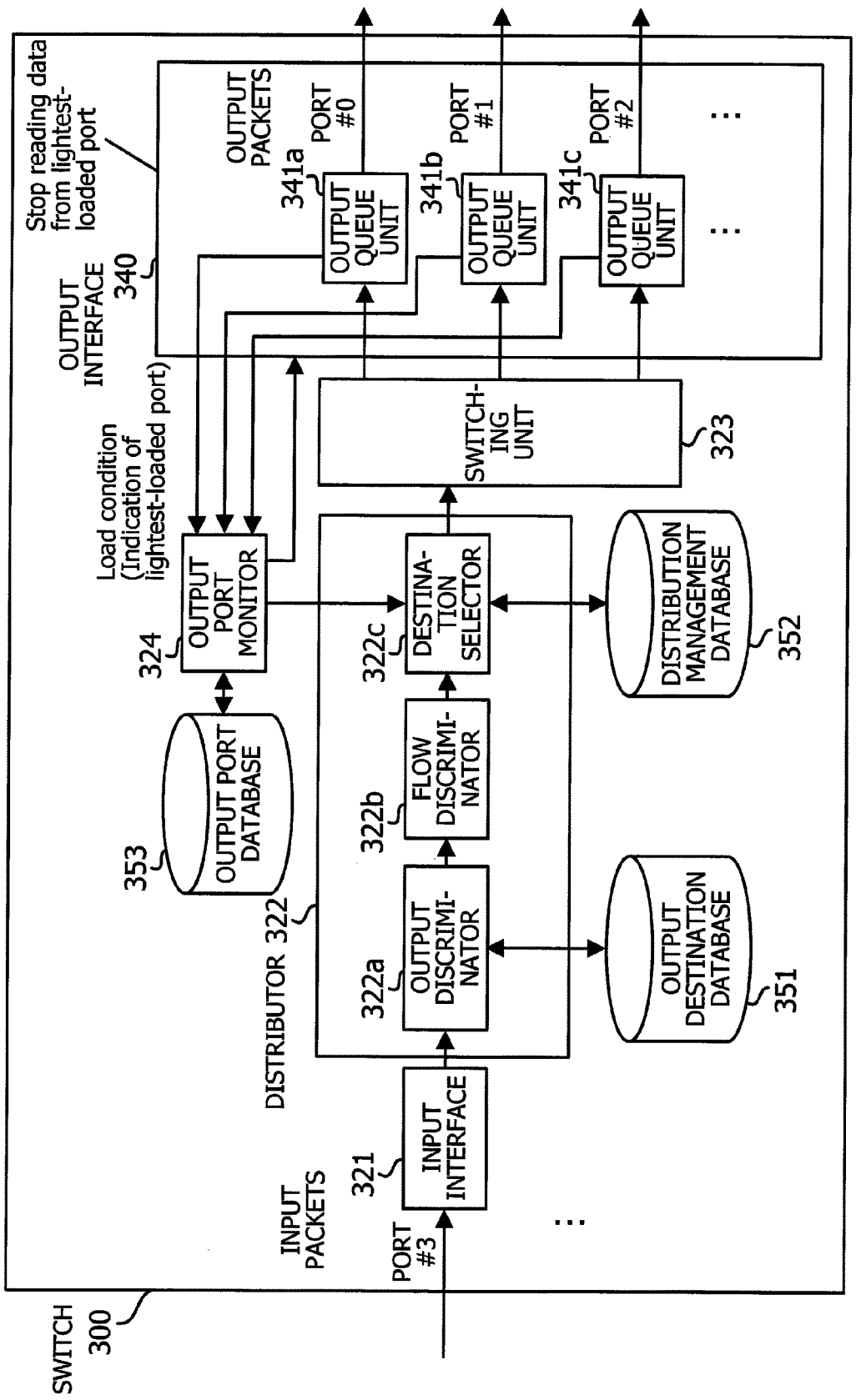
FIG. 18 is a block diagram of a switch according to a third embodiment.

In addition to providing the foregoing features of the first embodiment, the third embodiment is designed to stop reading transmit data from the lightest-loaded port. FIG. 18 is a block diagram of a switch according to the third embodiment. As can be seen from FIG. 18, the illustrated switch 300 transfers packets carrying segmented data via a logical link, or LAG, constituted by an aggregation of ports. To this end, the switch 300 includes an input interface 321, a distributor 322, a switching unit 323, an output port monitor 324, an output interface 340, an output destination database 351, a distribution management database 352, and an output port database 353. The distributor 322 includes an output discriminator 322a, a flow discriminator 322b, and a destination selector 322c. The output interface 340 contains a plurality of output queue units 341a, 341b, 341c, . . . corresponding to individual output ports.

The input interface 321 provides connections to switches, terminals, information processing devices, or other type of apparatuses having communication functions via LAG or other type of network links. The input interface 321 has input ports (e.g., port #3) to receive a flow of packets containing segmented data from those devices. Those packets are to be forwarded to neighboring switches, terminals, and other communication apparatuses.

The distributor 322 determines which port is to be used to output the flow of packets received by the input interface 321, with reference to destination data stored in the output destination database 351 and distribution management data stored in the distribution management database 352. Specifically, the distributor 322 selects an output port from among the ports #0, #1, #2, . . . constituting a LAG group for the received packet flow.

The distributor 322 also relies on the output port monitor 324 to see how much load is imposed on each port. If an abnormal amount of load is found in a port, the distributor 322 changes the destination of packets from the current output port to another port belonging to the same LAG group. To make this change, the distributor 322 compares the ports with each other in terms of the amount of buffer data stored in their corresponding output queue units and chooses the one with the largest amount of stored data.

As mentioned, the above distributor 322 includes an output discriminator 322a, flow discriminator 322b, and destination selector 322c. The output discriminator 322a determines which ports may be used to output packets that the input interface 321 has received, based on their header information, together with destination data which has been produced from learning results of MAC address and stored in the output destination database 351. Instead of MAC address learning, the output discriminator 322a may rely on the IP address and routing protocol to determine the range of ports.

Specifically, this output discriminator 322a examines the destination MAC address of each packet of the received flow to determine to which output ports those packets are supposed to go. More specifically, the output discriminator 322a extracts a MAC address from a packet of the received flow. The foregoing destination data associates this MAC address with a particular output port, which permits the switch 300 to determine the output port for the given packet flow.

To support packet flows using LAG, the destination data corresponding to a specific MAC address contains parameters that indicate the use of a LAG for the flow of packets having that address and enumerate output ports of that LAG group. According to such destination data, the output discriminator 322a determines to which LAG group the given packet flow is to be directed.

When LAG is in operation, the flow discriminator 322b identifies to which flow each received packet belongs, by using a flow identifier produced from header information of the packets. In this operation, the flow discriminator 322b extracts header information from a received packet and subjects the extracted header information to a hash algorithm to produce its flow identifier. The packet header (e.g., a leading portion of a packet) actually contains various addresses used to determine from which terminal (or its group) the packet has been transmitted, and for which terminal (or its group) the packet is destined. A typical packet header includes source MAC address, destination MAC address, source IP address, destination IP address, and other parameters.

The destination selector 322c uses the hash value calculated by the flow discriminator 322b to retrieve a relevant entry of distribution management data. Based on this distribution management data, the destination selector 322c determines which port to use to output packets. Also, to make efficient use of the bandwidth offered by a plurality of constituent ports of a LAG group, the destination selector 322c selects an output port out of the LAG group, based on the state of LAG ports monitored by the output port monitor 324 (described later).

The switching unit 323 directs packets to their output ports determined by the distributor 322. The packet flow entered to the switch 300 is thus retransmitted from output ports of the output interface 340 toward its destination, under the distribution control of the distributor 322.

The output port monitor 324 monitors each port of the output interface 340 in terms of congestion, load, failure, and other conditions and events regarding data traffic. For example, the output port monitor 324 watches the amount of data stored in the buffer of each output queue unit 341a, 341b, 341c, . . . and notifies the distributor 322 of its observations on each buffer, besides saving them as output port data in the output port database 353. To this end, the output port monitor 324 monitors the current queue length of each output port of LAG, i.e., the total amount of packet data awaiting transmission in each port. The output port monitor 324 also monitors the load condition of each port, which is, according to the present embodiment, observed as the total amount of packet data entered to an output queue unit during a given interval. The invention is, however, not limited to this configuration. For example, the output port monitor 324 may be configured to observe the long-term load of an output port by calculating a weighted sum of past load data of that port.

The output interface 340 provides a plurality of ports #0, #1, #2, . . . to transmit data and their corresponding output queue units 341a, 341b, 341c, . . . each including buffer storage for output data. As described earlier, the distributor 322 seeks an output port having a larger amount of buffer data than the current output port when the output port monitor 324 finds abnormal load on a port. If there are no such ports, then the output interface 340 suspends the output operation of the lightest-loaded port of all the ports other than the current port.

The output queue units 341a, 341b, 341c, . . . are associated with ports #0, #1, #2, . . . of the output interface 340, respectively, for the purpose of controlling quality of data transmission. Packets may concurrently arrive at a plurality of ports (e.g., port #3) of the input interface 321 in the switch 300. The output queue units 341a, 341b, 341c, . . . adjust the retransmission timings of those packets by reading data from each buffer in a first-in first-out fashion. These output queue units 341a, 341b, 341c, . . . are what have been discussed as storage units in FIG. 1.

The output destination database 351 stores destination data in the form of an output destination table 151a (FIG. 6). This destination data indicates for which port (or for which LAG ports) each specific packet flow is destined.

The distribution management database 352 stores distribution management data in the form of a distribution management table 152a (FIG. 7). This distribution management data is a collection of records indicating output ports that the destination selector 322c has selected to transmit packet flows.

The output port database 353 stores output port data in the form of an output port table 153a (FIG. 8). This output port data describes the current buffer queue length of each output port, congestion status and error status of output communication links, and other things.

With the above-described components, the present embodiment performs processing operations described below.

Figure 19:
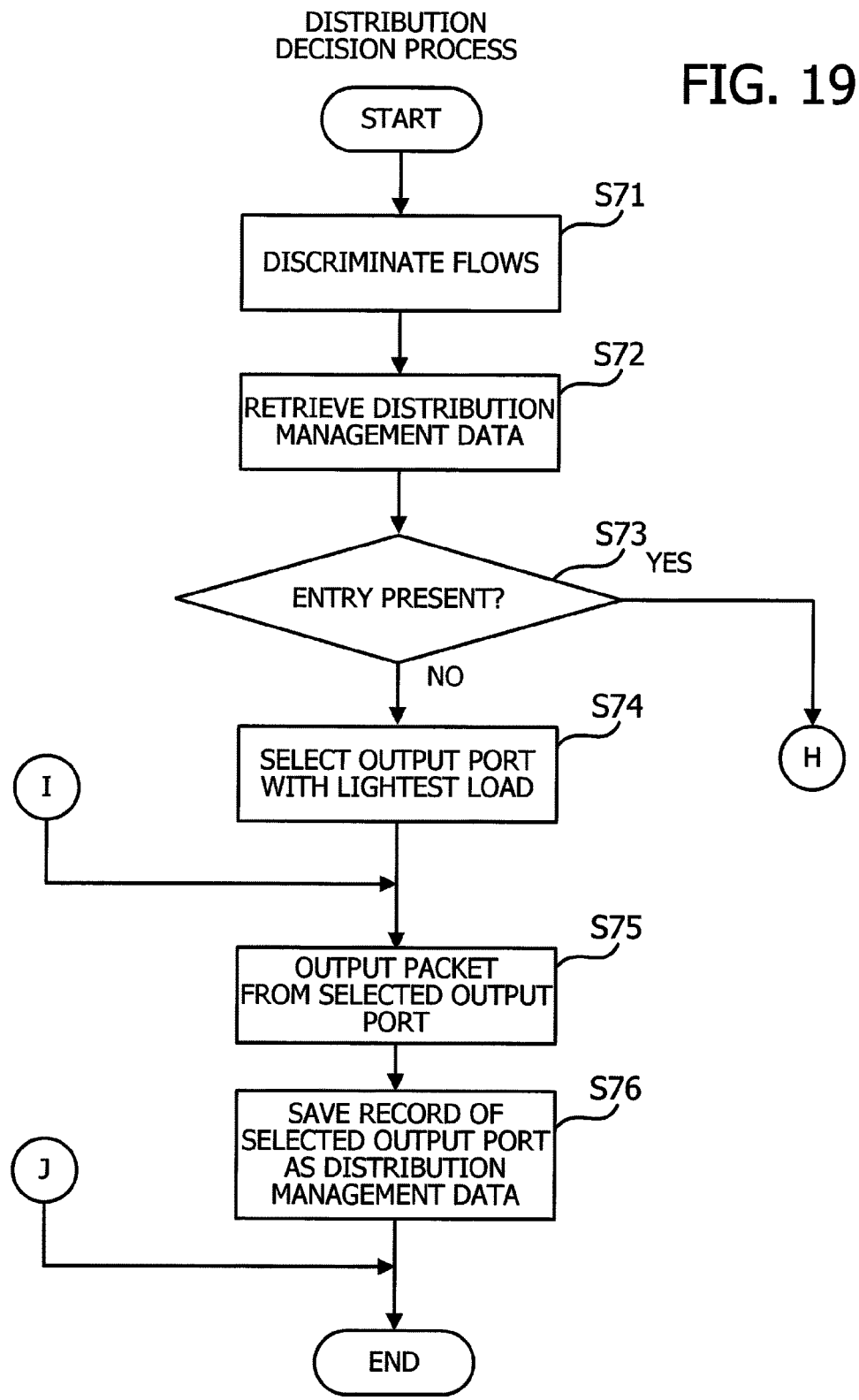
FIGS. 19 and 20 are a flowchart of a process of making distribution decisions according to a third embodiment.
Figure 20:
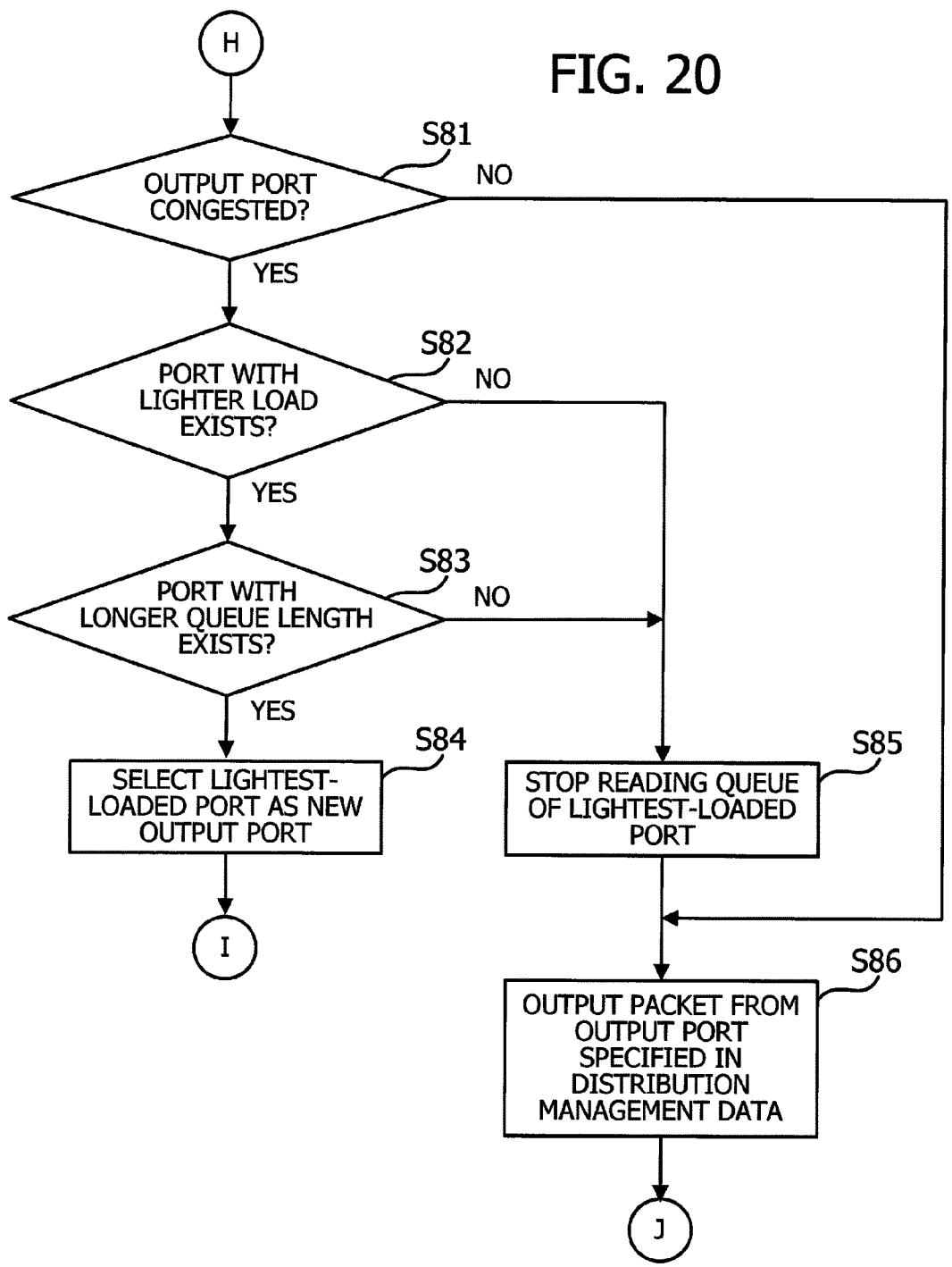

FIGS. 19 and 20 are a flowchart of a process of making distribution decisions according to the third embodiment. This process is to choose an appropriate output port from among those constituting a LAG and output a flow of packets from the selected output port. As described earlier in FIG. 18, the input interface 321 receives a packet arriving at the switch 300. By consulting the output destination table 151a (FIG. 6) stored in the output destination database 351, the output discriminator 322a determines whether the received packet is supposed to be transmitted via a LAG. If the determination result is positive, then the following process executes to make distribution decisions.

(Step S71) The flow discriminator 322b (FIG. 18) discriminates to which flow the received packet belongs, based on a flow identifier calculated by subjecting its header information to a hash algorithm.

(Step S72) The destination selector 322c (FIG. 18) retrieves distribution management data from the distribution management table 152a (FIG. 7) stored in the distribution management database 352 (FIG. 18).

(Step S73) By comparing the flow identifier of step S71 with the distribution management data retrieved at step S72, the destination selector 322c determines whether there is an existing entry for the received packet flow. If there is, the process branches to step S81 (FIG. 20). If there are no such entries, the process advances to step S74.

(Step S74) Based on observations by the output port monitor 324, the destination selector 322c selects a lightest-loaded output port from among those belonging to the LAG for the received packet flow, thus determining which output port to use to transmit the flow.

(Step S75) The destination selector 322c directs the received packet to the output port determined at step S74. The packet is thus transmitted from that port to a neighboring switch or the like.

(Step S76) The destination selector 322c updates the distribution management table 152a in the distribution management database 352 to register the output port determined at step S74 as a new piece of distribution management data, thus completing the process.

(Step S81) Based on observations by the output port monitor 324, the destination selector 322c determines whether the output port currently selected for the received packet flow is congested. If the port is found to be congested, the process advances to step S82. If not, the process proceeds to step S86.

(Step S82) Based on observations by the output port monitor 324, the destination selector 322c examines each LAG port for the packet flow to determine whether there are any other output ports whose load is smaller than that of the current output port. If there are, then the process advances to step S83. If not, the process proceeds to step S85.

(Step S83) Based on observations by the output port monitor 324, the destination selector 322c further examines the ports qualified at step S82 to determine whether any of them has a longer queue than the current output port. If there are, then the process advances to step S84. If not, the process proceeds to step S85.

(Step S84) The destination selector 322c now selects the lightest-loaded output port from among those qualified at step S83, thus determining which output port to use to transmit the given packet flow. The process then proceeds to step S75 (FIG. 19).

(Step S85) The output interface 340 suspends reading of queued data from the lightest-loaded port. Once the reading is suspended, the output interface 340 does not cancel the suspension until a predetermined condition is met. For example, the suspension may be maintained until the queue length of the port in question increases up to the level of the current output port at the time of the suspension. The present embodiment is, however, not limited to this configuration. Any other methods may be used as long as they can prevent the transmission sequence of a flow of packets from being disturbed.

(Step S86) The destination selector 322c consults the distribution management database 352 to retrieve relevant distribution management data from its distribution management table 152a. The destination selector 322c directs the received packet to an output port specified in the retrieved distribution management data. The packet is thus transmitted from that port to a neighboring switch or the like, and the process is completed.

As can be seen from the above description, the third embodiment provides a solution for the case where no other port has a longer queue than the then-selected output port. The third embodiment suspends reading of queued data from a lightest-loaded port. As time passes, the queue of that port grows and may reach the level of the current output port that is experiencing congestion. Then the third embodiment permits changing the assignment of output ports.

Fourth Embodiment

This section will describe a fourth embodiment. Since the fourth embodiment shares some elements with the foregoing first embodiment, the following description will focus on its distinctive points, while affixing like reference numerals to like elements.

The fourth embodiment is different from the first embodiment in its way of selecting a new output port when the current port becomes congested. Specifically, the fourth embodiment chooses a port with a lighter load, no matter how long its queue is. The fourth embodiment also delays the start of reading subsequent packets out of the newly selected port buffer by a time proportional to the difference of queue lengths between the original port and the new port. Another difference from the first embodiment is that the fourth embodiment chooses a new output port with a sufficient buffer vacancy when the current output port is found to be congested.

Figure 21:
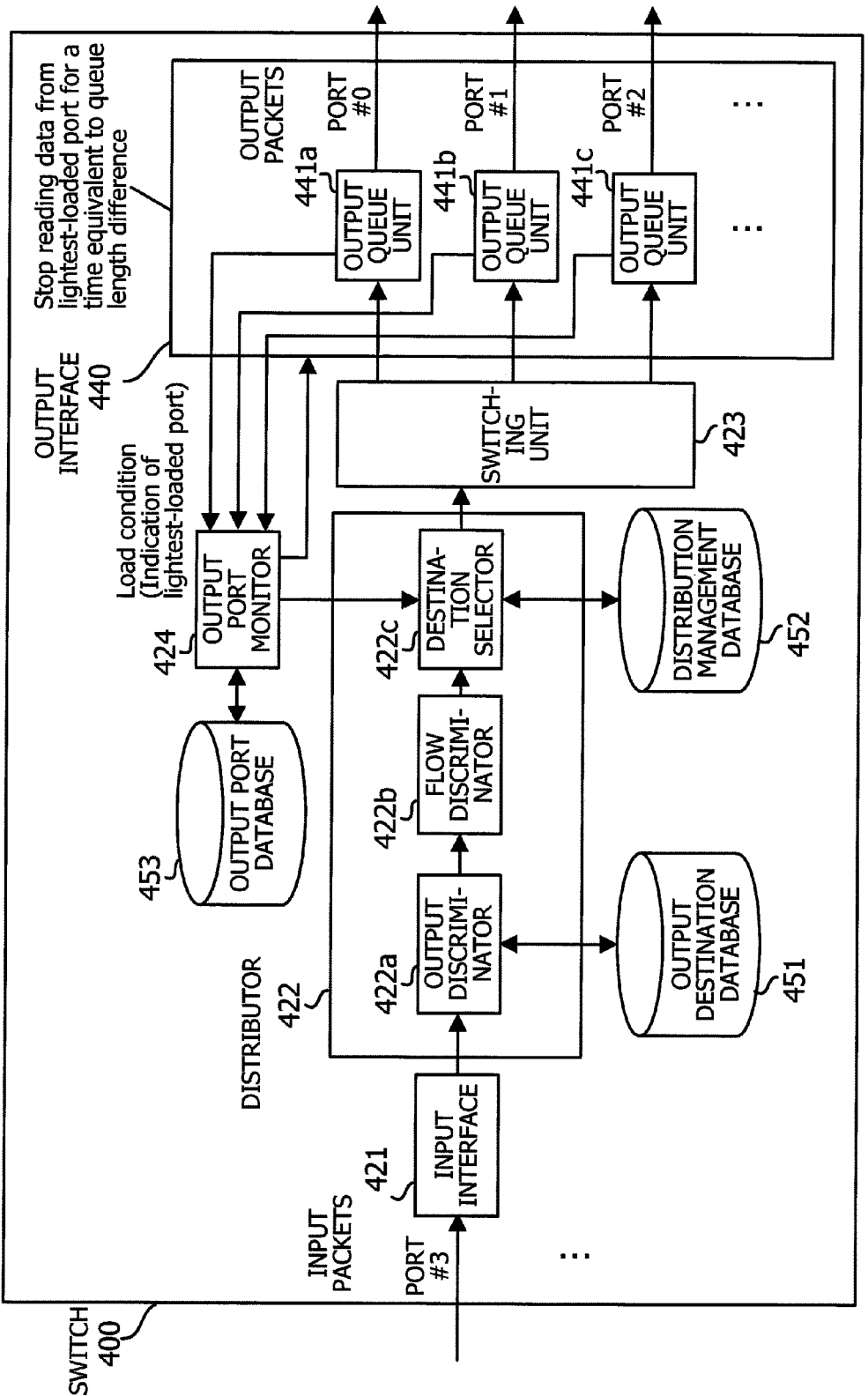
FIG. 21 is a block diagram illustrating a switch according to a fourth embodiment.

FIG. 21 is a block diagram illustrating a switch according to the fourth embodiment. As can be seen from FIG. 21, the illustrated switch 400 transfers packets carrying segmented data via a logical link, or LAG, constituted by an aggregation of ports. To this end, the switch 400 includes an input interface 421, a distributor 422, a switching unit 423, an output port monitor 424, an output interface 440, an output destination database 451, a distribution management database 452, and an output port database 453. The distributor 422 includes an output discriminator 422a, a flow discriminator 422b, and a destination selector 422c. The output interface 440 contains a plurality of output queue units 441a, 441b, 441c, . . . corresponding to individual output ports.

The input interface 421 provides connections to switches, terminals, information processing devices, or other type of apparatuses having communication functions via LAG or other type of network links. The input interface 421 has input ports (e.g., port #3) to receive a flow of packets containing segmented data from those devices. Those packets are to be forwarded to neighboring switches, terminals, and other communication apparatuses.

The distributor 422 determines which port is to be used to output the flow of packets received by the input interface 421, with reference to destination data stored in the output destination database 451 and distribution management data stored in the distribution management database 452. Specifically, the distributor 422 selects an output port from among the ports #0, #1, #2, . . . constituting a LAG group for the received packet flow.

The distributor 422 also consults the output port monitor 424 to see how much load is imposed on each port. If an abnormal amount of load is found in the current output port, the distributor 422 changes it to the lightest-loaded port in the same LAG group. To make this change, the distributor 422 compares ports with each other in terms of the amount of buffer data stored in their corresponding output queue units, thereby extracting the ports with a larger amount of stored data than the currently selected output port. From those extracted ports, the distributor 422 then singles out a port whose buffer occupancy is the closest to that of the current output buffer.

The distributor 422 further requires the new output port to have at least a specified amount of space margin in its buffer, with respect to the current queue length. The distributor 422 delays transmission data from the newly selected output port by a time corresponding its difference of queue lengths. By taking into account the capacity margin of a port buffer (e.g., a 10% vacancy of its maximum capacity) in addition to its load and queue length conditions, the distributor 422 prevents the output ports from being changed too often, besides avoiding the problem of buffer overflow. Accordingly, this feature makes it possible to use the available bandwidth more efficiently.

As mentioned, the above distributor 422 includes an output discriminator 422a, flow discriminator 422b, and destination selector 422c. The output discriminator 322a determines which ports may be used to output packets that the input interface 421 has received, based on their header information, together with destination data which has been produced from learning results of MAC address and stored in the output destination database 351. Instead of MAC address learning, the output discriminator 422a may rely on the IP address and routing protocol to determine the range of ports.

Specifically, this output discriminator 422a examines the destination MAC address of each packet of the received flow to determine to which output port those packets are supposed to go. More specifically, the output discriminator 422a extracts a MAC address from a packet of the received flow. The foregoing destination data associates this MAC address with a particular output port, which permits the switch 400 to determine the output port for the given packet flow.

To support packet flows using LAG, the destination data corresponding to a specific MAC address contains parameters that indicate the use of a LAG for the flow of packets having that address and enumerate output ports of that LAG group. According to such destination data, the output discriminator 422a determines to which LAG group the given packet flow is to be directed.

When LAG is in operation, the flow discriminator 422b identifies to which flow each received packet belongs, by using a flow identifier produced from header information of the packets. In this operation, the flow discriminator 422b extracts header information from a received packet and subjects the extracted header information to a hash algorithm to produce its flow identifier. The packet header (e.g., a leading portion of a packet) actually contains various addresses used to determine from which terminal (or its group) the packet has been transmitted, and for which terminal (or its group) the packet is destined. A typical packet header includes source MAC address, destination MAC address, source IP address, destination IP address, and other parameters.

The destination selector 422c uses the hash value calculated by the flow discriminator 422b to retrieve a relevant entry of distribution management data. Based on this distribution management data, the destination selector 422c determines which port to use to output packets. Also, to make efficient use of the bandwidth offered by a plurality of constituent ports of a LAG group, the destination selector 422c selects an output port out of the LAG group, based on the state of LAG ports monitored by the output port monitor 424 (described later).

The switching unit 423 directs packets to their output ports determined by the distributor 422. Accordingly, an incoming packet flow to the switch 400 is received and retransmitted from an output port to its destination under the control of the distributor 422.

The output port monitor 424 monitors each port of the output interface 440 in terms of congestion, load, failure, and other conditions and events regarding data traffic. For example, the output port monitor 424 watches the amount of data stored in the buffer of each output queue unit 441a, 441b, 441c, . . . and notifies the distributor 422 of its observations on each buffer, besides saving them as output port data in the output port database 453. These output queue units 441a, 441b, 441c, . . . are what have been discussed as storage units in FIG. 1.

The output port monitor 424 monitors the current queue length of each output port of LAG, i.e., the total amount of packet data awaiting transmission in each port. The output port monitor 424 also monitors the load condition of each port, which is, according to the present embodiment, observed as the total amount of packet data entered to an output queue unit during a given interval. The invention is, however, not limited to this configuration. For example, the output port monitor 424 may be configured to observe the long-term load of an output port by calculating a weighted sum of past load data of that port.

The output interface 440 provides a plurality of ports #0, #1, #2, . . . to transmit data and their corresponding output queue units 441a, 441b, 441c, . . . each including buffer storage for output data.

The output queue units 441a, 441b, 441c, . . . are associated with ports #0, #1, #2, . . . of the output interface 440, respectively, for the purpose of controlling quality of data transmission. Packets may concurrently arrive at a plurality of ports (e.g., port #3) of the input interface 421. The output queue units 441a, 441b, 441c, . . . adjust the retransmission timings of those packets by reading data from each buffer in a first-in first-out fashion.

The output destination database 451 stores destination data in the form of an output destination table 151a (FIG. 6). This destination data indicates for which port (or for which LAG ports) each specific packet flow is destined.

The distribution management database 452 stores distribution management data in the form of a distribution management table 152a (FIG. 7). This distribution management data is a collection of records indicating output ports that the destination selector 422c has selected to transmit packet flows.

The output port database 453 stores output port data in the form of an output port table 153a (FIG. 8). This output port data describes the current buffer queue length of each output port, congestion status and error status of output communication links, and other things.

With the above-described components, the present embodiment performs processing operations described below.

Figure 22:
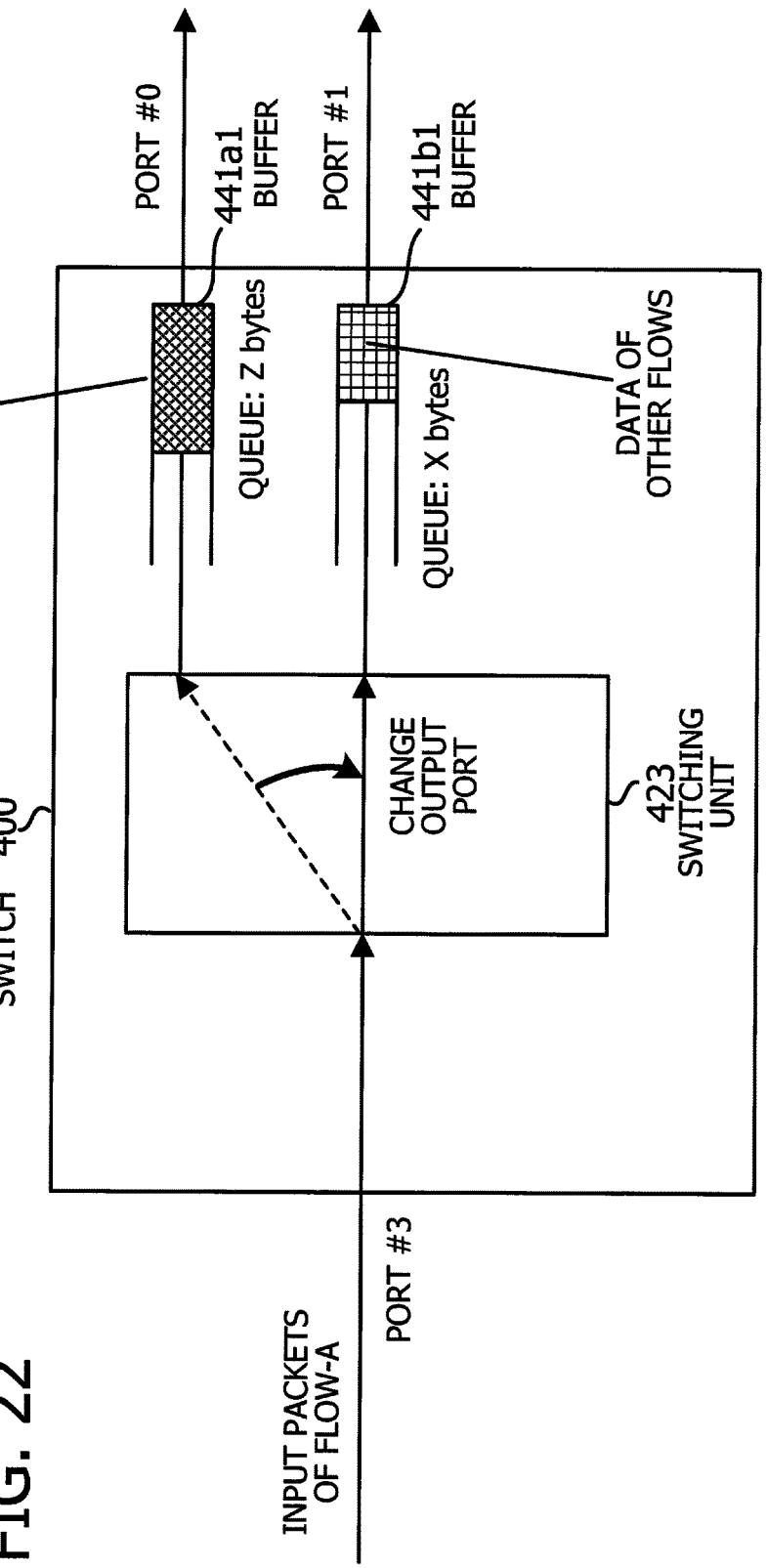
FIG. 22 illustrates a state of the switch according to the fourth embodiment in the case where incoming packets are switched to a new output port in the middle of their flow.
Figure 23:
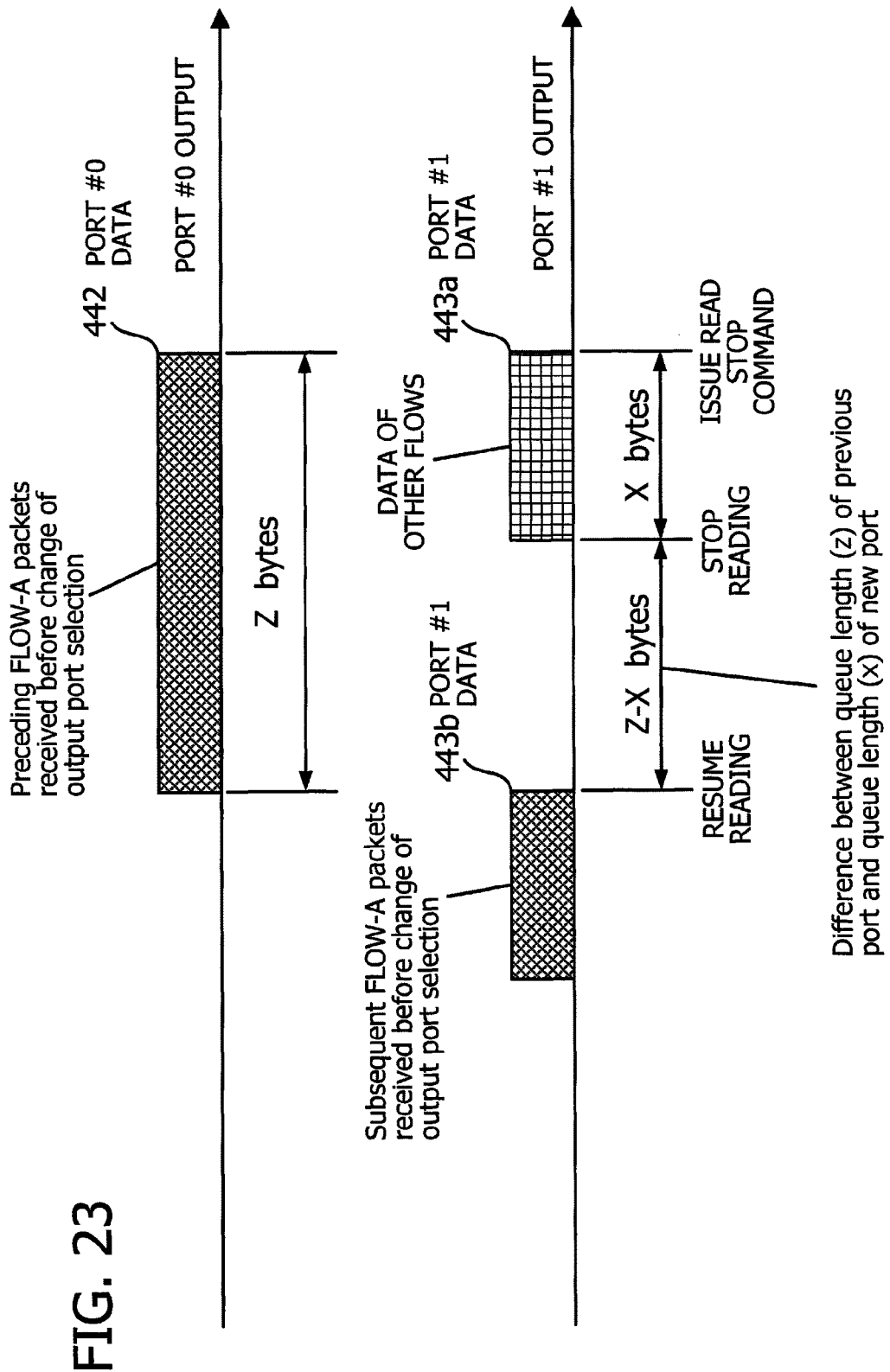
FIG. 23 illustrates operation of queues according to the fourth embodiment in the case where incoming packets are switched to a new output port in the middle of their flow.

FIG. 22 illustrates a state of the switch according to the fourth embodiment in the case where incoming packets are switched to a new output port in the middle of their flow. FIG. 23 illustrates operation of queues according to the fourth embodiment in the case where incoming packets are switched to a new output port in the middle of their flow.

As can be seen from FIG. 22, a series of packets of FLOW-A arrives at port #3 of the switch 400. Output port #0 of FLOW-A is congested, and the queue in its corresponding buffer 441a1 has grown to Z bytes. Accordingly, the distributor 422 chooses an alternative port #1 from the LAG ports of FLOW-A, as a result of seeking a lightest-loaded port with a certain amount of headroom in its buffer capacity. The switching unit 423 directs received packets according to this choice. The subsequent packets of FLOW-A are thus transmitted from port #1, while the preceding packets stored in a buffer are transmitted from port #0.

Suppose now that the buffer 441b1 of port #1 contains a queue of X bytes. Note that the newly selected output port #1 is shorter than the original output port #0 in queue length (i.e., Z>X). This means that, without appropriate measures, the subsequent FLOW-A packets would be transmitted from port #1 earlier than some preceding packets waiting in port #0, as illustrated in FIG. 23. In this situation, the change of output port selection would disrupt the original packet sequence of FLOW-A.

To avoid the above-described problem, the switch 400 according to the fourth embodiment is designed to delay the start of packet transmission from the new output port #1. That is, the switch 400 controls the timing of data transmission after the change from original output port to new output port, thereby preventing the sequence of FLOW-A from being disturbed.

Referring again to FIGS. 22 and 23, the proposed switch 400 operates as follows. Upon receipt of subsequent packets of FLOW-A, the distributor 422 (FIG. 21) changes the output port from port #0 to port #1 and then commands the output queue unit 441b (FIG. 21) of port #1 to suspend reading the data out of the new output port #1, as well as notifying it of the queue length (Z bytes) of the original output port #0. In response, the output queue unit 441b of port #1 reads and saves the queue length (X bytes) of data 443a stored in its corresponding buffer 441b1 at that moment. The output queue unit 441b of port #1 subsequently reads and outputs as much data out of the buffer 441b1 as the saved queue length (X bytes) and then suspends its read operation for a time.

Referring to FIG. 23, the following section will explain how the output queue unit 441b suspends reading of buffer data. The original output port #0 stores data 442 of preceding FLOW-A packets, which forms a queue of Z bytes. The output queue unit 441b of port #1 has been notified of this value Z by the distributor 422. The newly selected output port #1, on the other hand, stores data 443a of some other flow, which forms a queue of X bytes. The output queue unit 441b of port #1 then calculates (Z−X), i.e., the difference between those queue lengths. The output queue unit 441b does not read out its queue data until a lapse of a data transmission time equivalent to the calculated difference (Z−X). The output queue unit 441b then resumes the reading of data 443b to transmit subsequent packets of FLOW-A from the new output port #1.

Suppose, for example, that the original output port #0 has FLOW-A data forming a queue of 100 Mbytes (Z), while the new output port #1 has other flow data forming a queue of 50 Mbytes (X). Both ports #0 and #1 are capable of transmitting data at the rate of 1000 Mbps. In response to a read stop command from the distributor 422, the output queue unit 441b transmits the then-queued data of 50 Mbytes and suspends further reading operation of port #1. The output queue unit 441b does not resume the reading of queue data from port #1 until a lapse of 400 ms (i.e., (100−50)Mbytes*8/1000 Mbps). This wait time is equivalent to an expected transmission time of as much data as the queue length difference between port #0 and port #1 which carry traffic of FLOW-A and other flows, respectively. Accordingly, the subsequent packets of FLOW-A are transmitted from port #1 after the lapse of 400 ms.

With the above-described components, the present embodiment performs processing operations described below.

Figure 24:
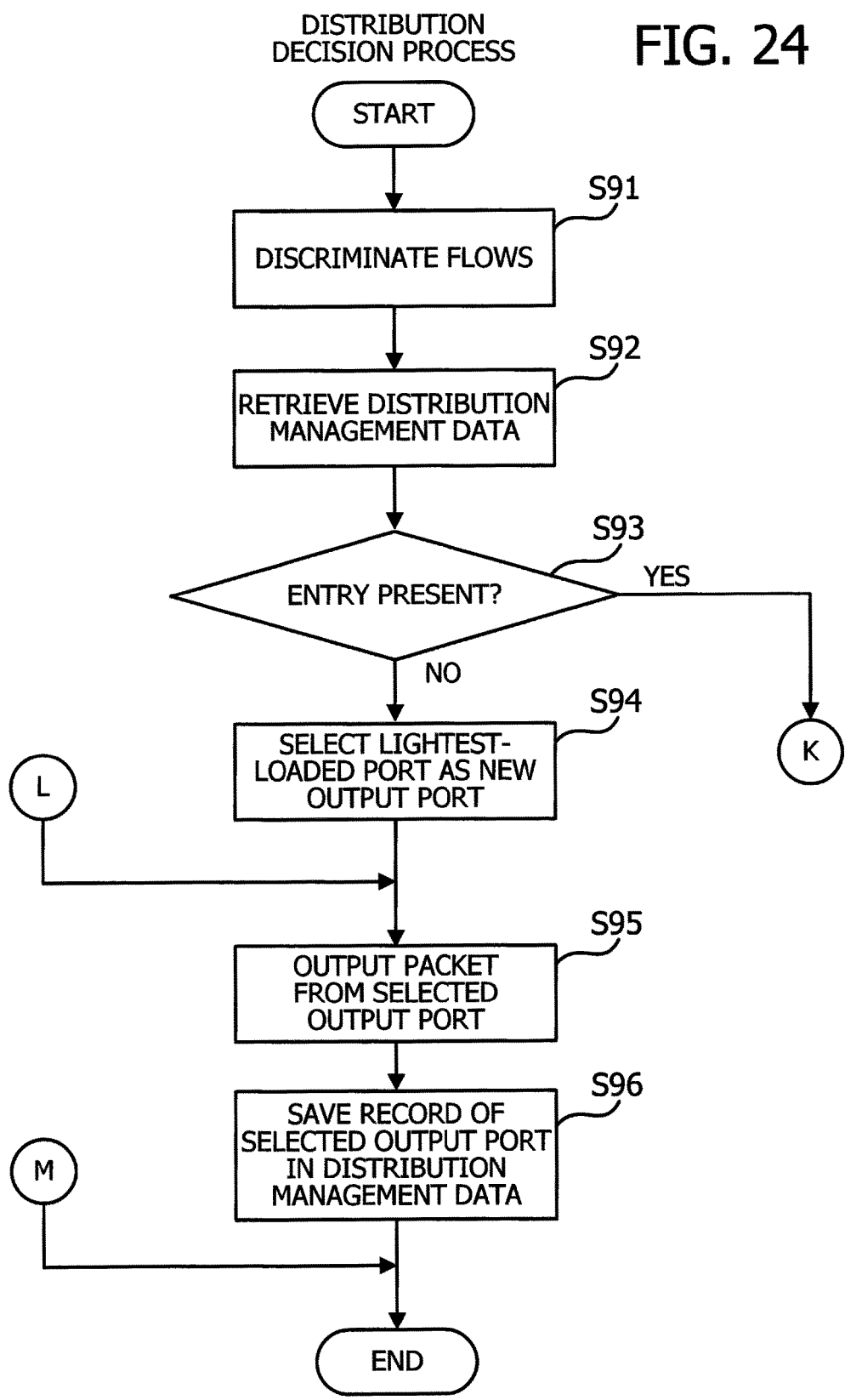
FIGS. 24 and 25 are a flowchart of a process of making distribution decisions according to the fourth embodiment.
Figure 25:
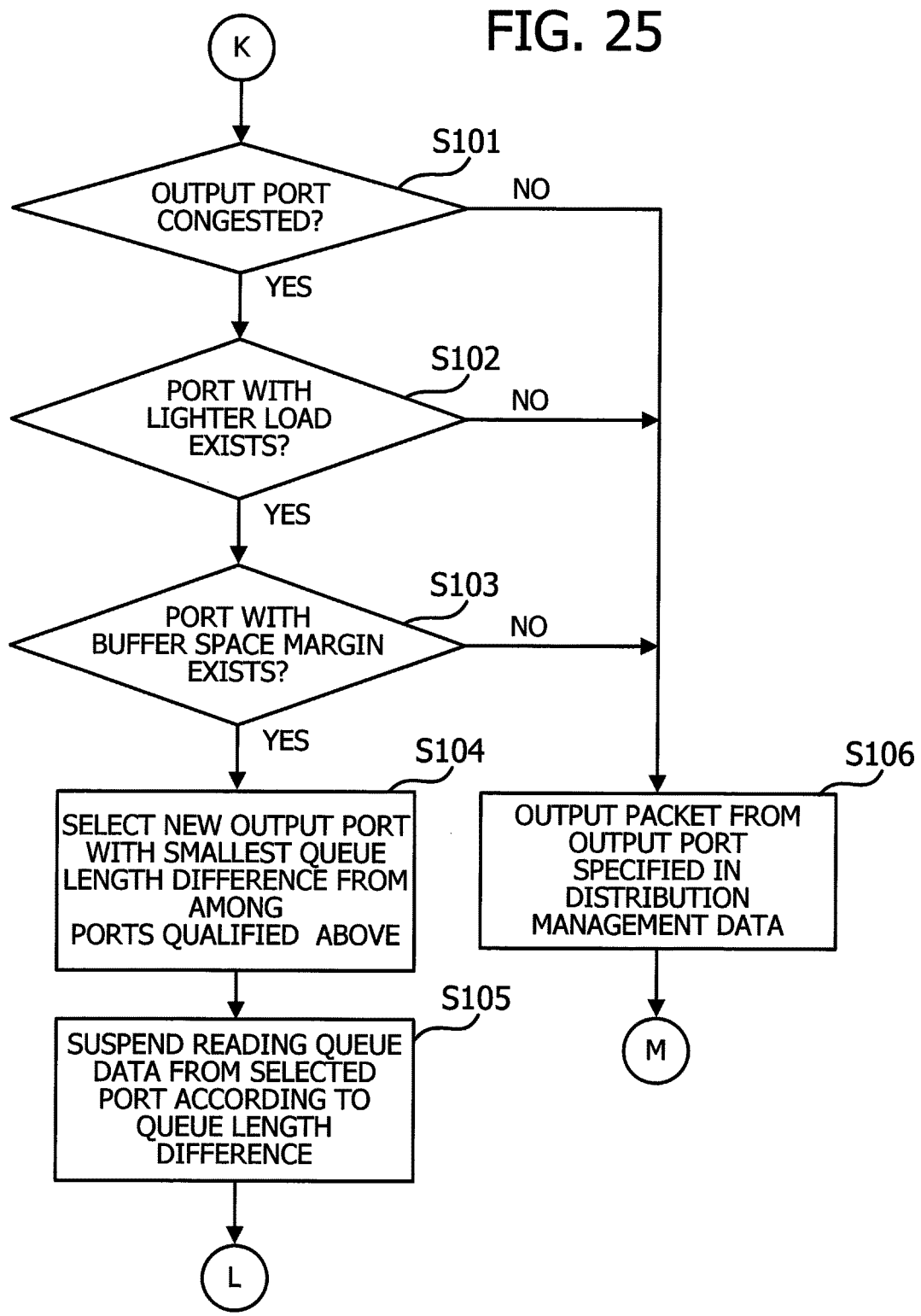

FIGS. 24 and 25 are a flowchart of a process of making distribution decisions according to the fourth embodiment. This process is to choose an appropriate output port from among those constituting a LAG and output a flow of packets from the selected output port. As described earlier in FIG. 21, the input interface 421 receives a packet arriving at the switch 400. By consulting the output destination table 151a (FIG. 6) stored in the output destination database 451, the output discriminator 422a determines whether the received packet is supposed to be transmitted via a LAG. If the determination result is positive, then the following process executes to make distribution decisions.

(Step S91) The flow discriminator 422b (FIG. 21) discriminates to which flow the received packet belongs, based on a flow identifier calculated by subjecting its header information to a hash algorithm.

(Step S92) The destination selector 422c (FIG. 21) retrieves distribution management data from the distribution management table 152a (FIG. 7) stored in the distribution management database 452 (FIG. 21).

(Step S93) By comparing the flow identifier of step S91 with the distribution management data retrieved at step S92, the destination selector 422c determines whether there is an existing entry for the received packet flow. If there is, the process branches to step S101 (FIG. 25). If there are no such entries, the process advances to step S94.

(Step S94) Based on observations by the output port monitor 424, the destination selector 422c selects a lightest-loaded output port from among those belonging to the LAG for the received packet flow, thus determining which output port to use to transmit the flow.

(Step S95) The destination selector 422c directs the received packet to the output port determined at step S94 so as to transmit it from that port to a neighboring switch or the like.

(Step S96) The destination selector 422c updates the distribution management table 152a in the distribution management database 452 to register the output port determined at step S94 as a new piece of distribution management data and thus completes the process.

(Step S101) Based on observations by the output port monitor 424, the destination selector 422c determines whether the output port currently selected for the received packet flow is congested. If the port is found to be congested, the process advances to step S102. If not, the process proceeds to step S106.

(Step S102) Based on observations by the output port monitor 424, the destination selector 422c examines each LAG port for the packet flow to determine whether there are any other output ports whose load is smaller than that of the current output port. If there are, then the process advances to step S103. If not, the process proceeds to step S106.

(Step S103) Based on observations by the output port monitor 424, the destination selector 422c further examines the ports qualified at step S102 to determine whether any of them has a buffer vacancy not smaller than a specified amount. If there are such ports, the process advances to step S104. If not, the process advances to step S106.

(Step S104) The destination selector 422c now selects the lightest-loaded output port from among those qualified at step S103, thus determining which output port to use to transmit the given packet flow.

(Step S105) The output interface 440 suspends reading of queued data from the new output port selected at step S104. The output interface 440 does not resume the reading until the difference of queue lengths between the previous output port and new output port is reduced to zero. The process then proceeds to step S95 (FIG. 24).

(Step S106) The destination selector 422c consults the distribution management database 452 to retrieve relevant distribution management data from its distribution management table 152a. The destination selector 422c directs the received packet to an output port specified in the retrieved distribution management data. The packet is transmitted from that port to a neighboring switch or the like, and the process is then completed.

As can be seen from the above description, the selection of output ports is changed during the course of transmission of a packet flow using a LAG. The fourth embodiment makes the change while maintaining the correct sequence of packets in that flow. This is achieved by restricting subsequent packets directed to the new output port from being transmitted until the previous output port transmits all the preceding packets which has been queued therein before congestion is encountered.

The fourth embodiment chooses a new output port, taking into account the capacity margin of a port buffer in addition to load and queue length conditions, thereby preventing the output ports from being changed too often, besides avoiding the problem of buffer overflow. Accordingly, this feature makes it possible to use the available bandwidth more efficiently.

Fifth Embodiment

This section will describe a fifth embodiment. Since the fifth embodiment shares some elements with the foregoing first embodiment, the following description will focus on its distinctive points, while affixing like reference numerals to like elements.

The foregoing first embodiment monitors the load condition of each port and provides the observations to the distributor of each input port. To deliver many pieces of such information to its internal components, the switch needs additional signal lines aside from those for main communication signals carrying packets.

Unlike the first embodiment, the fifth embodiment offers a mechanism that sends loopback packets from input ports to output ports in a switch so that those loopback packets will be looped back from output ports. By observing the response time of each loopback packet, the fifth embodiment estimates the congestion and load conditions of ports.

Figure 26:
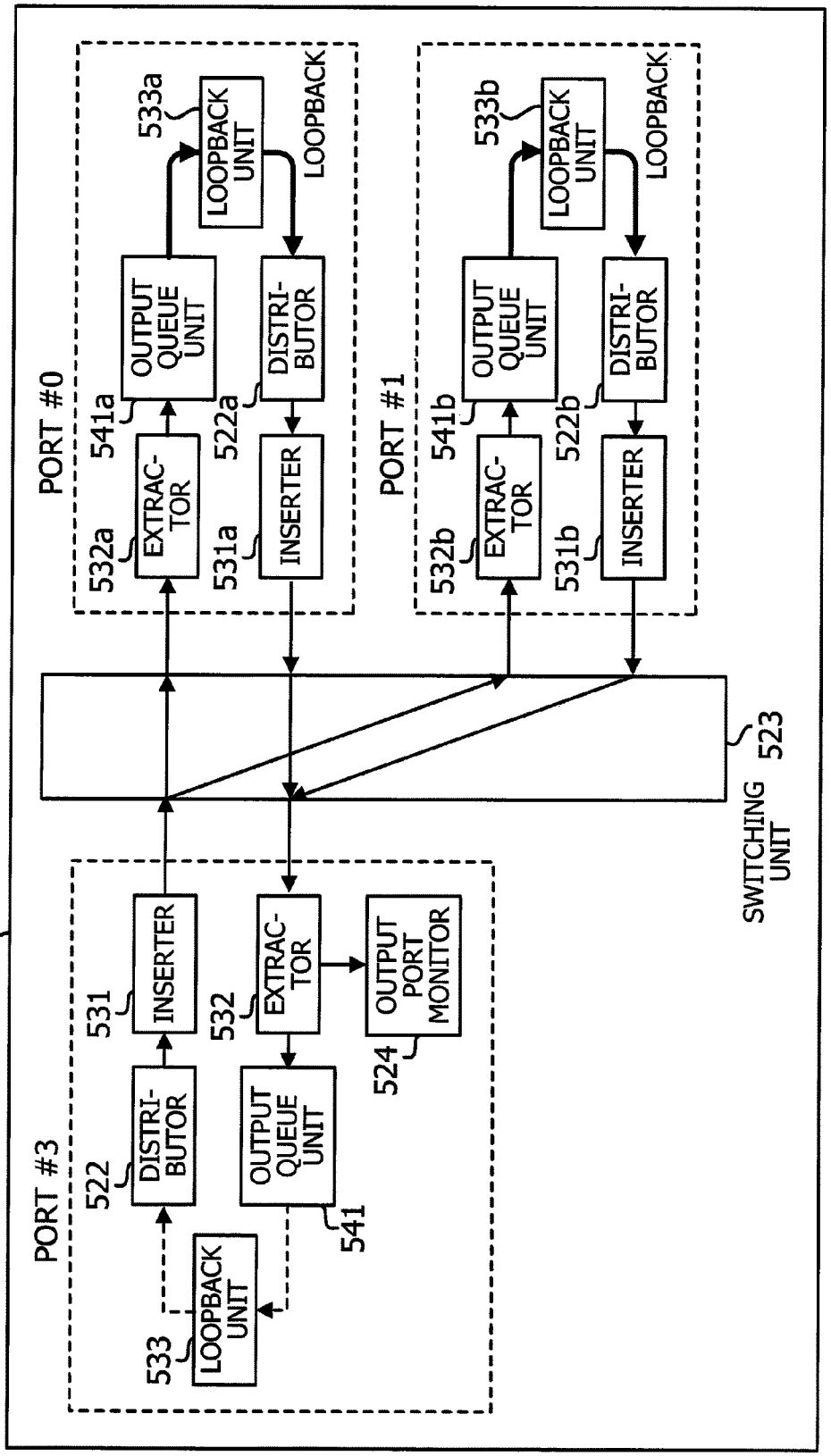
FIG. 26 is a block diagram a switch according to a fifth embodiment.

FIG. 26 is a block diagram a switch according to the fifth embodiment. As can be seen from FIG. 26, the illustrated switch 500 transfers packets carrying segmented data via a logical link, or LAG, constituted by an aggregation of ports. The switch 500 has port #3 at its input end and ports #0 and #1 and a switching unit 523 at its output end, the latter constituting a LAG group. The numbers of ports and LAGs of the switch 500 are, however, not limited by this specific example.

Input port #3 includes a distributor 522, an inserter 531, an extractor 532, a loopback unit 533, and an output queue unit 541. Likewise, output ports #0 and #1 include distributors 522a and 522b, inserters 531a and 531b, extractors 532a and 532b, loopback units 533a and 533b, and output queue units 541a and 541b, respectively. In addition to the above, port #3 includes an output port monitor 524. Although not depicted in FIG. 26, ports #0 and #1 also include their respective output port monitors.

While not depicted in FIG. 26, the switch 500 further includes an input interface, an output interface, an output destination database, a distribution management database, and an output port database as in the preceding embodiments. Also, the distributor of each port includes an output discriminator, a flow discriminator, and a destination selector not depicted in FIG. 26.

Packets received at input port #3 are directed to an output port which is determined or specified by the corresponding distributor 522. The distributors 522, 522a and 522b determine which port is to be used to output a flow of packets received by their corresponding input interfaces, with reference to destination data stored in their corresponding output destination databases and distribution management data stored in their corresponding distribution management databases. Specifically, the distributor 522 selects either port #0 or port #1 to output the received packet flow since these two ports #0 and #1 constitute a LAG group for that flow.

The distributor 522 also relies on the output port monitor 524 to see how much load is imposed on each port. If an abnormal amount of load is found in port #0 or #1, the distributor 522 changes the output port selection for the packets arriving at port #3 packets from the current output port to another port belonging to the same LAG group. To make this change, the distributor 522 compares the ports with each other in terms of the amount of buffer data stored in their corresponding output queue units and chooses the one with a larger amount of stored data. Other distributors 522a and 522b operate similarly.

The switching unit 523 directs given packets to their respective output ports according to distribution decisions made by the corresponding distributors. Accordingly, incoming packet flows to the switch 500 are received and retransmitted from output ports to their respective destinations, under the control of each corresponding distributor.

The output port monitor 524 monitors each output port of the switch 500 in terms of congestion, load, failure, and other conditions and events regarding data traffic. For example, the output port monitor 524 watches the amount of data stored in the buffer of each output queue unit 541, 541a, and 541b and notifies the distributors 522, 522a, and 522b of its observations on each buffer, besides saving them as output port data in an output port database (not illustrated).

According to the present embodiment, the output port monitor 524 measures the load of ports #0 and #1 by monitoring loopback packets. For example, loopback packets are inserted at the inserter 531 of port #3, which are looped back by the loopback unit 533a of port #0 and the loopback unit 533b of port #1. The extractor 532 of port #3 extracts returned loopback packets. The output port monitor 524 calculates a response time of those loopback packets (i.e., the time between their insertion and extraction), thereby estimating the load condition of each port.

The output port monitor 524 also uses those loopback packets to detect a failure in the switch 500. Suppose, for example, that the output port monitor 524 may see no loopback packets from a port for a certain period of time. This indicates that the port has some problem.

The output port monitor 524 monitors the current queue length of each output port of LAG, i.e., the total amount of packet data awaiting transmission in each port. The output port monitor 524 also monitors the load condition of each port. While the present embodiment observes the load by calculating response times of loopback packets as mentioned above, the invention is not limited by this specific configuration. For example, the output port monitor 524 may be configured to observe the long-term load of an output port by calculating a weighted sum of past load data of that port. The same applies to other output port monitors employed in ports #0 and #1.

The inserters 531, 531a, and 531b produce a loopback packet for internal use within the switch 500. The loopback units 533, 533a, and 533b route those inserted loopback packets back to their sources. The extractor 532, 532a, and 532b extract the loopback packets which have been originated in their corresponding ports and looped back by the loopback unit 533, 533a, and 533b.

The output queue units 541, 541a, and 541b are associated with different ports of the switch 500 for the purpose of controlling quality of data transmission. Packets may concurrently arrive at a plurality of input ports (e.g., port #3) of the switch 500. The output queue units 541, 541a, and 541b adjust the retransmission timings of those packets by reading data from each buffer in a first-in first-out fashion. These output queue units 541, 541a, and 541b are what have been discussed as storage units in FIG. 1.

The input interface (not illustrated) of each port provides connections to switches, terminals, information processing devices, or other type of apparatuses having communication functions via LAG or other type of network links.

The output destination database (not illustrated) of each port stores destination data in the form of an output destination table 151a (FIG. 6). This destination data indicates for which port (or for which LAG ports) each specific packet flow is destined.

The distribution management database (not illustrated) of each port stores distribution management data in the form of a distribution management table 152a (FIG. 7). This distribution management data is a collection of records indicating output ports that the corresponding destination selector has selected to transmit packet flows.

The output port database (not illustrated) of each port stores output port data in the form of an output port table 153a (FIG. 8). This output port data describes the current buffer queue length of each output port, congestion status and error status of output communication links, and other things.

In operation of the present embodiment, loopback packets sent from input port #3 to output ports #0 and #1 are directed backward at the output end of their respective output queue units 541a and 541b. More specifically, the inserter 531 of port #3 transmits loopback packets to ports #0 and #1 at regular intervals, and the switching unit 523 distributes them to ports #0 and #1. In ports #0 and #1, the extractors 532a and 532b are designed to extract self-originated loopback packets while allowing other packets to pass therethrough. The loopback packets of port #3 thus go through to the output queue units 541*a* and 541*b* and then directed backward at the loopback units 533*a* and 533*b* of ports #0 and #1.

As a result of the above operation, a loopback packet inserted at an input port is returned to the originating input port via the output queue unit of each output port. In the example of FIG. 26, the extractor 532 of port #3 receives and extracts such loopback packets. By evaluating response times of those extracted loopback packets, the output port monitor 524 estimates congestion and load of the output ports.

As can be seen from the above description, the fifth embodiment uses loopback packets to monitor output ports. This feature alleviates the workload of additional processing within the switch.

Sixth Embodiment

This section will describe a sixth embodiment. Since the fifth embodiment shares some elements with the foregoing fifth embodiment, the following description will focus on its distinctive points, while affixing like reference numerals to like elements.

The foregoing fifth embodiment sends loopback packets from an input port to output ports in the switch so that those loopback packets will be looped back from output ports. Congestion and load of output ports can be estimated by evaluating response times of those loopback packets. Unlike the fifth embodiment, the following sixth embodiment sends loopback packets from an input port to output ports in the switch so that those loopback packets will be looped back at input ports of a neighboring switch connected to the output ports. Congestion and load of output ports are then similarly estimated by evaluating response times of those loopback packets.

Figure 27:
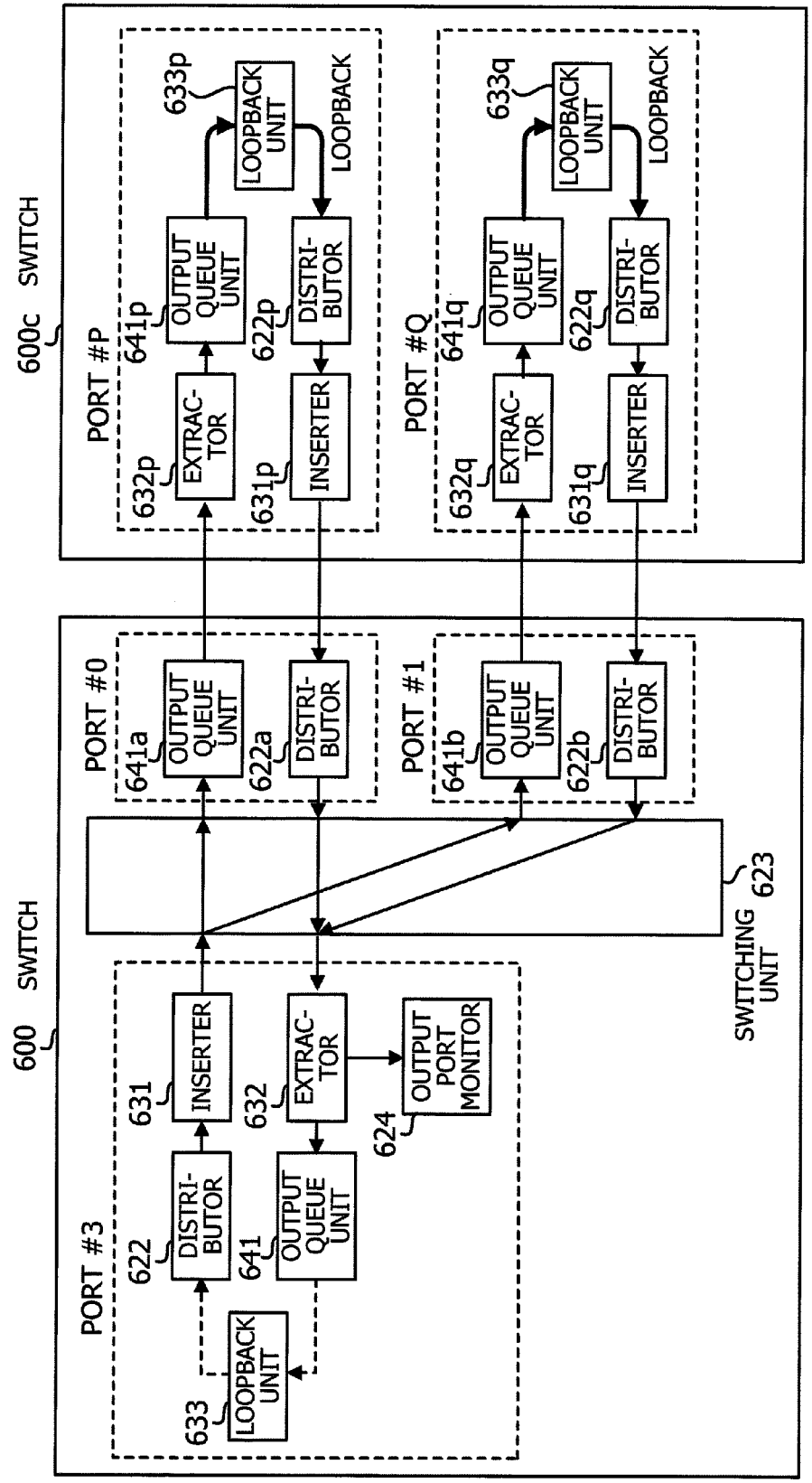
FIG. 27 is a block diagram a switch according to a sixth embodiment.

FIG. 27 is a block diagram a switch according to the sixth embodiment. As can be seen from FIG. 27, the illustrated switch 600 transfers packets carrying segmented data via a logical link, or LAG, constituted by an aggregation of ports. The switch 600 has port #3 at its input end, as well as ports #0 and #1 and a switching unit 623 at its output end, the latter constituting a LAG group. A neighboring switch 600*c* has ports #P and #Q at its input end, which are linked to output ports #0 and #1 of the local switch 600. The numbers of ports and LAGs of those switches 600 and 600*c* are, however, not limited by this specific example.

Input port #3 of the local switch 600 includes a distributor 622, an inserter 631, an extractor 632, a loopback unit 633, an output queue unit 641. Similarly, ports #P and #Q of the neighboring switch 600*c* include distributors 622*p* and 622*q*, inserters 631*p* and 631*q*, extractors 632*p* and 632*q*, loopback units 633*p* and 633*q*, and output queue units 641*p* and 641*q*, respectively. In addition to the above, port #3 includes an output port monitor 624. While not illustrated in FIG. 27, ports #P and #Q include their own output port monitors.

Output ports #0 and #1 of the local switch 600 provide the same or similar functions as their counterparts in the foregoing switch 500 of the fifth embodiment (FIG. 26). Those ports #0 and #1 include distributors 622*a* and 622*b*, output queue units 641*a* and 641*b*. While not depicted in FIG. 27, ports #0 and #1 each include an output port monitor, an inserter, an extractor, and a loopback unit.

The switches 600 and 600*c* further include an input interface, an output interface, an output destination database, a distribution management database, and an output port database as in the preceding embodiments, although FIG. 27 does not depict them. In addition, the distributor of each port includes an output discriminator, a flow discriminator, and a destination selector, which are not depicted in FIG. 27.

Packets received at input port #3 are directed to either port #0 or port #1 according to what has been determined or specified by the distributor 622. The packets that have arrived at port #0 are transmitted to port #P via a communication link. Likewise, the packet that have arrived at port #1 are transmitted to port #Q via another communication link.

The distributors 622, 622*a*, 622*b*, 622*p*, and 622*q* determine which port is to be used to output a flow of packets received by their corresponding input interfaces, with reference to destination data stored in their corresponding output destination databases and distribution management data stored in their corresponding distribution management databases. For example, the distributor 622 selects either port #0 or port #1 to output the received packet flow since these two ports #0 and #1 constitute a LAG group for that flow.

The distributor 622 relies on the output port monitor 624 to see how much load is imposed on each port. If an abnormal amount of load is found, the distributor 622 changes the output port selection for the packets arriving at port #3 packets from the current output port to another port belonging to the same LAG group. To make this change, the distributor 622 compares the ports with each other in terms of the amount of buffer data stored in their corresponding output queue units and chooses the one with a larger amount of stored data. Other distributors 622*a*, 622*b*, 622*p*, and 622*q* operate similarly.

The switching unit 623 directs given packets to their respective output ports according to distribution decisions made by the corresponding distributors. Accordingly, incoming packet flows to the switch 600 are received and retransmitted from output ports to their respective destinations, under the control of each corresponding distributor.

The output port monitor 624 monitors each output port of the switch 600 in terms of congestion, load, failure, and other conditions and events regarding data traffic. For example, the output port monitor 624 watches the amount of data stored in the buffer of each output queue unit 641, 641*a*, 641*b*, 641*p*, and 641*q* and notifies the distributors 622 of its observations, besides saving them as output port data in an output port database (not illustrated).

According to the present embodiment, the output port monitor 624 measures the load of a route involving ports #0 and #P, as well as a route involving ports #1 and #9, by monitoring loopback packets. For example, a loopback packet inserted at the inserter 631 of port #3 reaches port #P of the neighboring switch 600 and then looped back at its corresponding loopback unit 633*p*. The same occurs at the loopback unit 633*q* of port #Q. The extractor 632 of port #3 extracts those loopback packets returned from the neighboring switch 600. The output port monitor 624 calculates a response time of each returned loopback packet (i.e., the time between its insertion and extraction), thereby estimating the load condition of each route of packets.

The output port monitor 624 watches loopback packets which are inserted at the inserter 631 of port #3 and returned from the neighboring switch 600*c* to the originating port #3 via ports #0 and #1. By watching those loopback packets, the output port monitor 624 can detect a failure on those two round-trip routes including communication links. Suppose, for example, that the output port monitor 624 may see no loopback packets from a port for a certain period of time. This indicates that the port has some problem.

The output port monitor 624 monitors the current queue length of each output port of LAG, i.e., the total amount of packet data awaiting transmission in each port. The output port monitor 624 also monitors the load condition of each port. While the present embodiment observes the load on a port by calculating response times of loopback packets, the invention is not limited by this specific configuration. For example, the output port monitor 624 may be configured to observe the long-term load of an output port by calculating a weighted sum of past load data of that port. The same applies to other output port monitors employed in ports #0 and #1.

The inserter 631 produces loopback packets in the local switch 600, while the inserters 631*p* and 631*q* do the same in the neighboring switch 600*c*. The extractors 632, 632*p*, and 632*q* extract loopback packets that have been sent from their respective local switches and looped back in a neighboring switch. While not illustrated in FIG. 27, similar extractors are also employed in port #0 and port #1.

The loopback units 633, 633*p*, and 633*q* direct loopback packets backward or forward, depending on their setting, when such packets are received from other switches. While not illustrated in FIG. 27, similar loopback units are also employed in port #0 and port #1.

The output queue units 641, 641*a*, 641*b*, 641*p*, and 641*q* are associated with different ports of the switches 600 and 600*c* for the purpose of controlling quality of data transmission. For example, packets may concurrently arrive at a plurality of input ports (e.g., port #3) of the switch 600. The output queue units 641*a* and 641*b* adjust the retransmission timings of those packets by reading data from each buffer in a first-in first-out fashion. Those output queue units 641, 641*a*, 641*b*, 641*p*, and 641*q* serve as the storage units discussed earlier.

The input interface (not illustrated) of each port provides connections to switches, terminals, information processing devices, or other type of apparatuses having communication functions via LAG or other type of network links.

The output destination database (not illustrated) of each port stores destination data in the form of an output destination table 151*a* (FIG. 6). This destination data indicates for which port (or for which LAG ports) each specific packet flow is destined.

The distribution management database (not illustrated) of each port stores distribution management data in the form of a distribution management table 152*a* (FIG. 7). This distribution management data is a collection of records indicating output ports that the corresponding destination selector has selected to transmit packet flows.

The output port database (not illustrated) of each port stores output port data in the form of an output port table 153*a* (FIG. 8). This output port data describes the current buffer queue length of each output port, congestion status and error status of output communication links, and other things.

In operation of the present embodiment, loopback packets sent from the switch 600 are looped back at input ports #P and #Q of the receiving switch 600*c*. More specifically, the inserter 631 of port #3 transmits loopback packets to ports #P and #Q at regular intervals. The packets are delivered to ports #P and #Q via the switching unit 623, output ports #0 and #1, and their corresponding communication links.

The extractors 632*a* and 632*b*, as well as those in ports #0 and #1, are designed to extract self-originated loopback packets while allowing other packets to pass therethrough. The loopback packets sent from port #3 are thus allowed to go through to the output queue units 641*a* and 641*b* of ports #P and #Q. The packets are then looped back at the loopback units 633*p* and 633*q* of ports #P and #Q.

As a result of the above operation, every loopback packet inserted at an input port returns to the originating input port via the output queue unit of each output port and then via input ports of the neighboring switch. In the example of FIG. 27, the extractor 632 of port #3 receives and extracts such loopback packets. By evaluating response times of those extracted loopback packets, the output port monitor 524 estimates congestion and load of the input and output ports and communication links involved in the loopback.

As can be seen from the above description, the sixth embodiment uses loopback packets to monitor output ports, thus alleviating the workload of additional processing within the switch. Since the loopback packets propagate over to neighboring switches, the sixth embodiment makes it possible to monitor the occurrence of failure or other events on the communication links to those switches.

Seventh Embodiment

This section will describe a seventh embodiment. Since the seventh embodiment shares some elements with the foregoing first embodiment, the following description will focus on its distinctive points, while affixing like reference numerals to like elements.

The seventh embodiment differs from the first embodiment in that each output queue unit manages a plurality of queues representing different flows. For example, the output queue units maintain a plurality of queues to support different quality classes.

Figure 28:
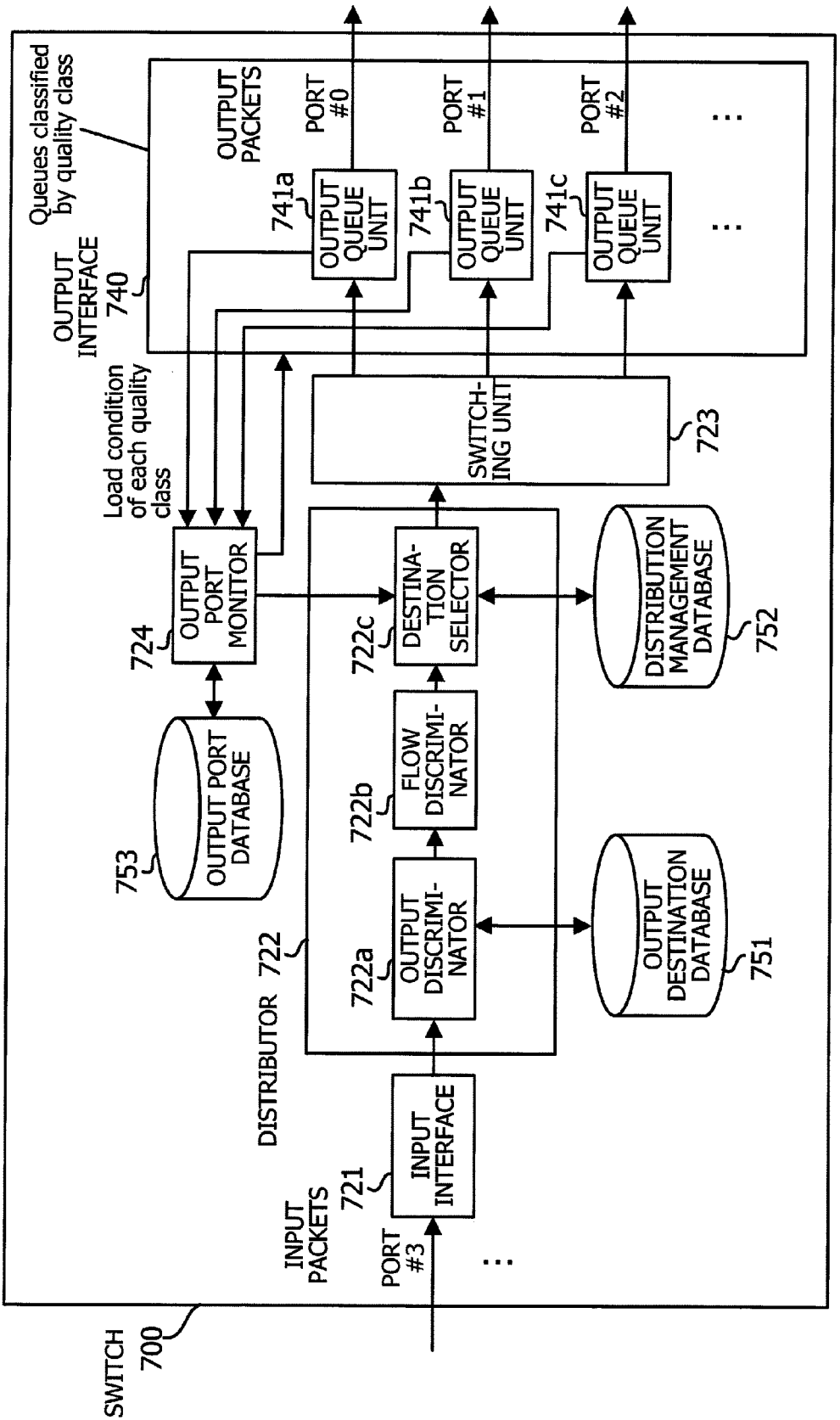
FIG. 28 is a block diagram a switch according to a seventh embodiment.

FIG. 28 is a block diagram a switch according to the seventh embodiment. As can be seen from FIG. 28, the illustrated switch 700 transfers packets carrying segmented data via a logical link, or LAG, constituted by an aggregation of ports. To this end, this switch 700 includes an input interface 721, a distributor 722, a switching unit 723, an output port monitor 724, an output interface 740, an output destination database 751, a distribution management database 752, and an output port database 753. The distributor 722 includes an output discriminator 722*a*, a flow discriminator 722*b*, and a destination selector 722*c*. The output interface 740 contains a plurality of output queue units 741*a*, 741*b*, 741*c*, ... corresponding to individual output ports.

The input interface 721 provides connections to switches, terminals, information processing devices, or other type of apparatuses having communication functions via LAG or other type of network links. The input interface 721 has input ports (e.g., port #3) to receive a flow of packets containing segmented data from those devices. Those packets are to be forwarded to neighboring switches, terminals, and other communication apparatuses.

According to the present embodiment, each flow of data is assigned a specific priority level. Based on this flow priority, the switch 700 transmits a high-priority flow in preference to low-priority flows, thereby maintaining required quality of communication.

The distributor 722 determines which port is to be used to output a flow of packets received by the input interface 721, with reference to destination data stored in the output destination database 751 and distribution management data stored in the distribution management database 752. Specifically, the distributor 722 selects an output port from among the ports #0, #1, #2, ... constituting a LAG group for the received packet flow.

The distributor 722 also relies on the output port monitor 724 to see how much load is imposed on each port. If an abnormal amount of load is found in a port, the distributor 722 changes the destination of packets from the current output port to another port belonging to the same LAG group. To make this change, the distributor 722 compares the ports with each other in terms of the amount of buffer data stored in their corresponding output queue units and chooses the one containing the largest amount of stored data in its buffer as a new output port. Here, the distributor 722 evaluates the amount of stored data by summing up the queues classified by flow priority.

As mentioned, the above distributor 722 includes an output discriminator 722a, flow discriminator 722b, and destination selector 722c. The output discriminator 722a determines which ports may be used to output packets that the input interface 721 has received, based on their header information, together with destination data which has been produced from learning results of MAC address and stored in the output destination database 751. Instead of MAC address learning, the output discriminator 722a may rely on the IP address and routing protocol to determine the range of ports.

Specifically, this output discriminator 722a examines the destination MAC address of each packet of the received flow to determine to which output port those packets are supposed to go. More specifically, the output discriminator 722a extracts a MAC address from a packet of the received flow. The foregoing destination data associates this MAC address with a particular output port, which permits the switch 700 to determine the output port for the given packet flow. To support packet flows using LAG, the destination data corresponding to a specific MAC address contains parameters that indicate the use of a LAG for the flow of packets having that address and enumerate output ports of that LAG group. According to such destination data, the output discriminator 722a determines to which LAG group the given packet flow is to be directed.

When LAG is in operation, the flow discriminator 722b identifies to which flow each received packet belongs, by using a flow identifier produced from header information of the packets. In this operation, the flow discriminator 722b extracts header information from a received packet and subjects the extracted header information to a hash algorithm to produce its flow identifier.

The packet header (e.g., a leading portion of a packet) actually contains various addresses used to determine from which terminal (or its group) the packet has been transmitted, and for which terminal (or its group) the packet is destined. A typical packet header includes source MAC address, destination MAC address, source IP address, destination IP address, and other parameters.

The destination selector 722c uses the hash value calculated by the flow discriminator 722b to retrieve a relevant entry of distribution management data. Based on this distribution management data, the destination selector 722c determines which port to use to output packets. Also, to make efficient use of the bandwidth offered by a plurality of constituent ports of a LAG group, the destination selector 722c selects an output port out of the LAG group, based on the state of LAG ports monitored by the output port monitor 724 (described later).

The switching unit 723 directs packets to their output ports determined by the distributor 722. Accordingly, an incoming packet flow to the switch 700 is received and retransmitted from an output port to its destination under the control of the distributor 722.

The output port monitor 724 monitors each port of the output interface 740 in terms of congestion, load, failure, and other conditions and events regarding data traffic. For example, the output port monitor 724 watches the amount of data stored in the buffer of each output queue unit 741a, 741b, 741c, . . . and notifies the distributors 622 of its observations, besides saving them as output port data in an output port database 753. To this end, the output port monitor 624 monitors the current queue length of each output port of LAG, i.e., the total amount of packet data awaiting transmission in each port. The output port monitor 624 also monitors the load condition of each port. which is, according to the present embodiment, observed as the total amount of packet data entered to an output queue unit during a given interval. The invention is, however, not limited to this configuration. For example, the output port monitor 724 may be configured to observe the long-term load of an output port by calculating a weighted sum of past load data of that port.

According to the present embodiment, the output port monitor 724 evaluates the load of an output port as a total amount of its stored data whose priority levels are equal to or greater than the priority level of the packet flow received at port #3 of the input interface 721. To achieve this, the output port monitor 724 watches the buffer occupancy of output queue units both on an individual port basis and on a priority basis.

The output interface 740 provides a plurality of ports #0, #1, #2, . . . to transmit data and their corresponding output queue units 741a, 741b, 741c, . . . each including buffer storage for output data. Under an abnormal load condition, the output interface 340 suspends the output operation of the lightest-loaded port of all the ports other than the current port, if it is unable to find an alternative output port that contains a larger amount of queued data than the current output port in its buffers whose priority levels are equal to or higher than the priority of the given packet flow.

The output queue units 741a, 741b, 741c, . . . are associated with ports #0, #1, #2, . . . of the output interface 740, respectively, for the purpose of controlling quality of data transmission. Packets may concurrently arrive at a plurality of ports (e.g., port #3) of the input interface 721. The output queue units 741a, 741b, 741c, . . . adjust the retransmission timings of those packets by reading data from each buffer in a first-in first-out fashion on an individual flow priority basis. These output queue units 741a, 741b, 741c, . . . act as what have been discussed as storage units in FIG. 1.

The output destination database 751 stores destination data in the form of an output destination table 151a (FIG. 6). This destination data indicates for which port (or for which LAG ports) each specific packet flow is destined.

The distribution management database 752 stores distribution management data in the form of a distribution management table 152a (FIG. 7). This distribution management data is a collection of records indicating output ports that the destination selector 722c has selected to transmit packet flows.

The output port database 753 stores output port data in the form of an output port table 153a (FIG. 8). This output port data describes the current buffer queue length of each output port, congestion status and error status of output communication links, and other things.

With the above-described components, the switch 700 according to the present embodiment performs processing operations described below.

Figure 29:
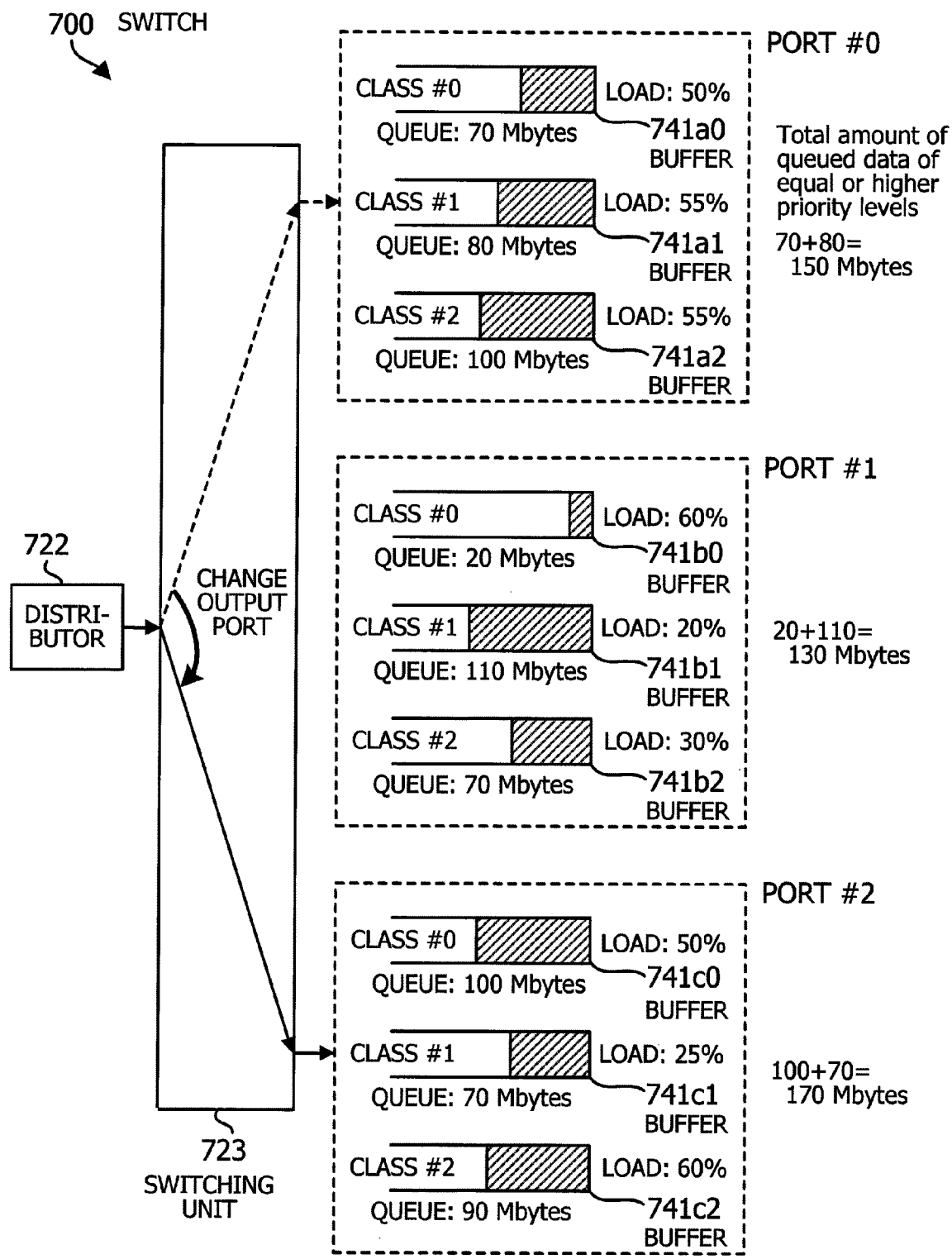
FIG. 29 illustrates a state of the switch according to the seventh embodiment in the case where incoming packets are switched to a new output port in the middle of their flow.

FIG. 29 illustrates a state of the switch 700 in the case where incoming packets are switched to a new output port in the middle of their flow. As can be seen from FIG. 29, a LAG is formed from three ports #0, #1, and #2, each port having three buffers corresponding to the priorities (e.g., quality classes #0 to #2) of transmit data. In this example, class #0 has the highest priority (i.e., always allowed to transmit data), which is followed by class #1 (i.e., allowed to transmit data when the class #0 buffer is empty) and then by class #2 (i.e., allowed to transmit data when both the class #0 and class #1 buffers are empty). Note that the number of classes or priority levels is not limited by this specific example.

Port #0 has three buffers 741a0, 741a1, and 741a2 to store flows of packets belonging to classes #0, #1, and #2, respectively. Likewise, port #2 has three buffers 741b0, 741b1, and 741b2 to store flows of packets belonging to classes #0, #1, and #2, respectively. Port #3 has three buffers 741c0, 741c1, and 741c2 to store flows of packets belonging to classes #0, #1, and #2, respectively.

It is assumed that port #0 has been selected as the output port for a packet flow of class #1, but is found to be congested when a subsequent packet of the same flow has entered the switch 700. It is also assumed that ports #1 and #2 has a lighter load than port #0. As in the foregoing first embodiment, the distributor 722 changes the selection of output ports. According to the seventh embodiment, the distributor 722 selects a new output port in the following way.

The output port monitor 724 (FIG. 28) calculates, for each individual port, a total amount of queued data in the buffer corresponding to the priority of the received flow and in other buffers corresponding to higher priorities than the received flow's. In the example of FIG. 29, the output port monitor 724 calculates a sum of queued data in the buffers of class #0 and class #1 in each port since the received flow has a priority of class #1. The current output port #0 in congestion contains 70 Mbytes in its buffer 741a0 of class #0 and 80 Mbytes in its buffer 741a1 of class #1. Thus the stored buffer data of port #0 amounts to 150 Mbytes.

The output port monitor 724 applies the same calculation to the other ports #1 and #2, either of which may be a new output port. The results are 130 Mbytes for port #1 and 170 Mbytes for port #2. The output port monitor 724 then notifies the distributor 722 of these calculation results as its observations.

Based on the above observations by the output port monitor 724, the distributor 722 executes a process of a process of making distribution decisions (FIGS. 10 and 11), as in the foregoing first embodiment. As noted above, port #2 has a total queue length of 170 Mbytes, which is greater than 150 Mbytes of the current output port #0. Accordingly, the output port monitor 724 chooses port #2 as the new output port.

As can be seen from the above description, the seventh embodiment handles packet flows based on their priority levels. The seventh embodiment thus offers a solution for a system where higher-priority packets are transmitted in preference to lower-priority packets for the purpose of ensuring quality of communication service.

According to the above-described communication apparatus and communication control method, a flow of packets can be transferred from switch to switch without disrupting the intended transmission sequence. When a certain physical link is encountering a concentration of outgoing packets, the selection of output ports is changed so as to direct the packets to a newly selected physical link. The proposed technique uses a plurality of output ports more effectively to distribute data, thus enabling more efficient forwarding of data.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that various changes, substitutions and alterations could be made hereto without departing from the spirit and scope of the invention.

What is claimed is:

1. A method of controlling a communications system that transfers segmented data over an aggregation of physical links constituting a logical link, the communication method comprising:
   storing data to be transmitted from a plurality of physical links of an output interface, to a plurality of storage units corresponding to the plurality of physical links;
   observing how much data is accumulated in each storage unit;
   observing a load condition of each physical link of the output interface;
   selecting which physical link is to be used to output received data; and
   changing the selection to an alternative physical link that has a larger amount of stored data than the currently selected physical link, based on said observation of data accumulated in the storage units, when the observing of the load condition observes an abnormal load on the currently selected physical link.

2. A communication apparatus for transferring segmented data over an aggregation of physical links constituting a logical link, the communication apparatus comprising:
   an input interface to receive a flow of data in segmented form;
   an output interface comprising a plurality of physical links to transmit the received data, and a plurality of storage units corresponding to the respective physical links to store data to be transmitted from the physical links;
   a link monitor unit to observe how much data is accumulated in each storage unit, as well as observing a load condition of each physical link of the output interface; and
   a distribution unit to select which physical link is to be used to output the received data, and to change the selection to an alternative physical link that has a larger amount of stored data than the currently selected physical link, based on the observations of data accumulated in the storage units, when the link monitor unit observes an abnormal load on the currently selected physical link.

3. The communication apparatus according to claim 1, wherein the distribution unit changes the selection to an alternative physical link that has at least a specified amount of vacancy in the corresponding storage unit, besides having a larger amount of stored data than the currently selected physical link.

4. The communication apparatus according to claim 1, wherein:
   the link monitor unit observes a load condition of each physical link of the output interface; and
   the output interface suspends transmission of data from one of the physical links other than the currently selected physical link, when the link monitor unit observes an abnormal load, and if the distribution unit fails to find a physical link that has a larger amount of stored data than the currently selected physical link.

5. The communication apparatus according to claim 4, wherein the output interface applies said suspension of transmission to a physical link whose load condition observed by the link monitor unit is the lightest of all the physical links other than the currently selected physical link.

6. The communication apparatus according to claim 1, wherein:
   the distribution unit chooses, from among a plurality of physical links having a larger amount of stored data than the currently selected physical link, a physical link with a smallest difference from the currently selected physical link in terms of the amount of stored data;

the distribution unit changes the selection to the newly chosen physical link; and the distribution unit suspends transmission of data from the newly chosen physical link for a period of time that corresponds to said difference in the amount of stored data.

7. The communication apparatus according to claim 1, wherein:

the link monitor unit detects a failure of the physical links; and the distribution unit directs the received data to one of the physical links other than the currently selected physical link, based on observations by the link monitor unit.

8. The communication apparatus according to claim 1, wherein the distribution unit disables further execution of said changing when the distribution unit has repeated said changing as many times as specified in a specified period of time.

9. The communication apparatus according to claim 1, wherein:

the physical links include an input physical link to receive packets of the data, and an output physical link to output the received packets;

the input physical link comprises an inserter to insert a loopback packet, and an extractor to extract the loopback packet;

the output physical link comprises a loopback unit to loop back the loopback packet inserted by the inserter; and the link monitor unit observes the load condition of each physical link by evaluating a lapse of time between said insertion of a loopback packet by the inserter and said extraction by the extractor of the loopback packet looped back by the loopback unit.

10. The communication apparatus according to claim 1, wherein:

the physical links include an input physical link to receive packets of the data, and an output physical link to output the received packets to a neighboring communication apparatus;

the input physical link comprises an inserter to insert a loopback packet, and an extractor to extract the loopback packet; and the link monitor unit evaluates the load condition of each physical link based on a lapse of time between said insertion of a loopback packet by the inserter and said extraction by the extractor of the loopback packet looped back by the neighboring communication apparatus.

11. The communication apparatus according to claim 1, wherein:

each flow of data is assigned a specific priority level;

the link monitor unit watches the amount of data accumulated in the storage units both on an individual port basis and on a priority basis, and evaluates the load condition of each physical link as a total amount of accumulated data whose priority levels are equal to or greater than the priority level of the received flow of data; and the distribution unit chooses, as the alternative physical link, a physical link whose total amount of accumulated data in the corresponding storage unit is larger than that of the currently selected physical link, based on the load condition of the physical links observed by the link monitor unit.

12. The communication apparatus according to claim 1, wherein the link monitor unit evaluates the load condition of a physical link, based on the amount of data accumulated in the corresponding storage unit, as well as on a transmission rate at which the received data is to be output therefrom, and produces load status information indicating the evaluated load condition of each physical link.

13. The communication apparatus according to claim 12, wherein the link monitor unit divides the amount of the accumulated data by the transmission rate, and outputs the quotient of that division as the load status information.

14. The communication apparatus according to claim 1, further comprising a distribution management database to store distribution management data that describes which physical link was used to output data of a specific flow and when the input interface received the last piece of data of that flow, wherein the distribution unit determines which physical link is to be used to output the data of the received flow, based on the distribution management data stored in the distribution management database, and wherein the distribution unit consults the distribution management database to retrieve distribution management data corresponding to the received flow and, if the retrieved distribution management data indicates a lapse of a specified time since the last reception of that flow, deletes the distribution management data from the distribution management database.

15. The communication apparatus according to claim 1, wherein the storage units read out stored data in a first-in first-out fashion.

* * * * *